(12) United States Patent
Kondoh

(10) Patent No.: US 10,225,434 B2
(45) Date of Patent: Mar. 5, 2019

(54) INFORMATION PROCESSING SYSTEM, INFORMATION PROCESSING APPARATUS, AND APPARATUS

(71) Applicant: Naritake Kondoh, Kanagawa (JP)

(72) Inventor: Naritake Kondoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/257,137

(22) Filed: Sep. 6, 2016

(65) Prior Publication Data

US 2017/0070640 A1 Mar. 9, 2017

(30) Foreign Application Priority Data

Sep. 9, 2015 (JP) .................... 2015-177590

(51) Int. Cl.
  *H04N 1/32* (2006.01)
  *H04N 1/00* (2006.01)
  *G06F 3/12* (2006.01)

(52) U.S. Cl.
  CPC ....... *H04N 1/32657* (2013.01); *G06F 3/1208* (2013.01); *G06F 3/1255* (2013.01);
  (Continued)

(58) Field of Classification Search
  CPC ........... H04N 1/32657; H04N 1/00204; H04N 1/0023; H04N 1/00344; H04N 1/32101;
  (Continued)

(56) References Cited

U.S. PATENT DOCUMENTS 9,176,682 B2 11/2015 Nishida
9,286,008 B2 3/2016 Kondoh
(Continued)

FOREIGN PATENT DOCUMENTS

EP 2469342 A1 6/2012
JP 2011-081741 4/2011
(Continued)

OTHER PUBLICATIONS

Extended European Search Report dated Feb. 2, 2017 issued in corresponding European Application No. 16187370.8.

*Primary Examiner* — Iriana Cruz
(74) *Attorney, Agent, or Firm* — Harness, Dickey & Pierce, P.L.C.

(57) ABSTRACT

An information processing system includes a first information processing apparatus coupled to a second information processing apparatus via a network. The first information processing apparatus includes a first acquisition unit to acquire first data including second data, a process information reader to read, when the first data satisfies a predetermined condition, process information in association with the predetermined condition from a storage, a transmitter to transmit, when the process information includes predetermined process information, third data to the second information processing apparatus, and an editor to edit the second data in accordance with the process information. The second information processing apparatus includes a second acquisition unit to acquire the third data from the first information processing apparatus, and a display unit to display on a display device indication that the second data are edited when the third data are acquired.

11 Claims, 26 Drawing Sheets

(52) U.S. Cl.
CPC .......... *G06F 3/1267* (2013.01); *G06F 3/1288* (2013.01); *H04N 1/0023* (2013.01); *H04N 1/00204* (2013.01); *H04N 1/00344* (2013.01); *H04N 1/32101* (2013.01); *H04N 2201/0039* (2013.01); *H04N 2201/0094* (2013.01)

(58) Field of Classification Search
CPC .... H04N 2201/0039; H04N 2201/0094; G06F 3/1208; G06F 3/1255; G06F 3/1267; G06F 3/1288
See application file for complete search history.

(56) References Cited

U.S. PATENT DOCUMENTS

| | | | |
|---|---|---|---|
| 2006/0221358 A1* | 10/2006 | Takahashi | H04N 1/00432 358/1.1 |
| 2009/0201551 A1 | 8/2009 | Uchida | |
| 2012/0167201 A1 | 6/2012 | Maeda et al. | |
| 2012/0300268 A1* | 11/2012 | Oseto | H04N 1/4426 358/474 |
| 2015/0029552 A1* | 1/2015 | Nishizawa | G06F 3/1253 358/1.15 |
| 2016/0080374 A1 | 3/2016 | Kondoh | |

FOREIGN PATENT DOCUMENTS

| | | |
|---|---|---|
| JP | 2011-248729 | 12/2011 |
| JP | 4905114 | 3/2012 |
| JP | 2012-108759 | 6/2012 |
| JP | 2013-097506 | 5/2013 |
| JP | 2014-167879 | 9/2014 |
| JP | 2014-179950 | 9/2014 |
| JP | 2015-056168 | 3/2015 |
| JP | 2015-152937 | 8/2015 |
| JP | 2016-062139 | 4/2016 |

* cited by examiner

FIG.7

```xml
<?xml version="1.0" encoding="UTF-8" standalone="yes"?>
<getJobListResponse>
    <errorCode>000000000000</errorCode>
    <totalCount>3</totalCount>
    <ruleCheckRequired>true</ruleCheckRequired>    ~6
    <jobList>
        <job>
            <creationTime>2015/01/27 09:47:23</creationTime>
            <id>1</id>
            <color>color</color>
            <copies>1</copies>
            <duplex>off</duplex>
            <name>JobName</name>                    }4
            <nup>2in1</nup>
            <pageCount>1</pageCount>
            <paperSize>A4</paperSize>
            <size>1</size>
        </job>
        <job>
            <creationTime>2015/01/27 09:47:23</creationTime>
            <id>2</id>
            <color>color</color>
            <copies>1</copies>
            <duplex>off</duplex>
            <name>JobName</name>                    }5
            <nup>2in1</nup>
            <pageCount>1</pageCount>
            <paperSize>A4</paperSize>
            <size>1</size>
        </job>
    </jobList>
</getJobListResponse>
```

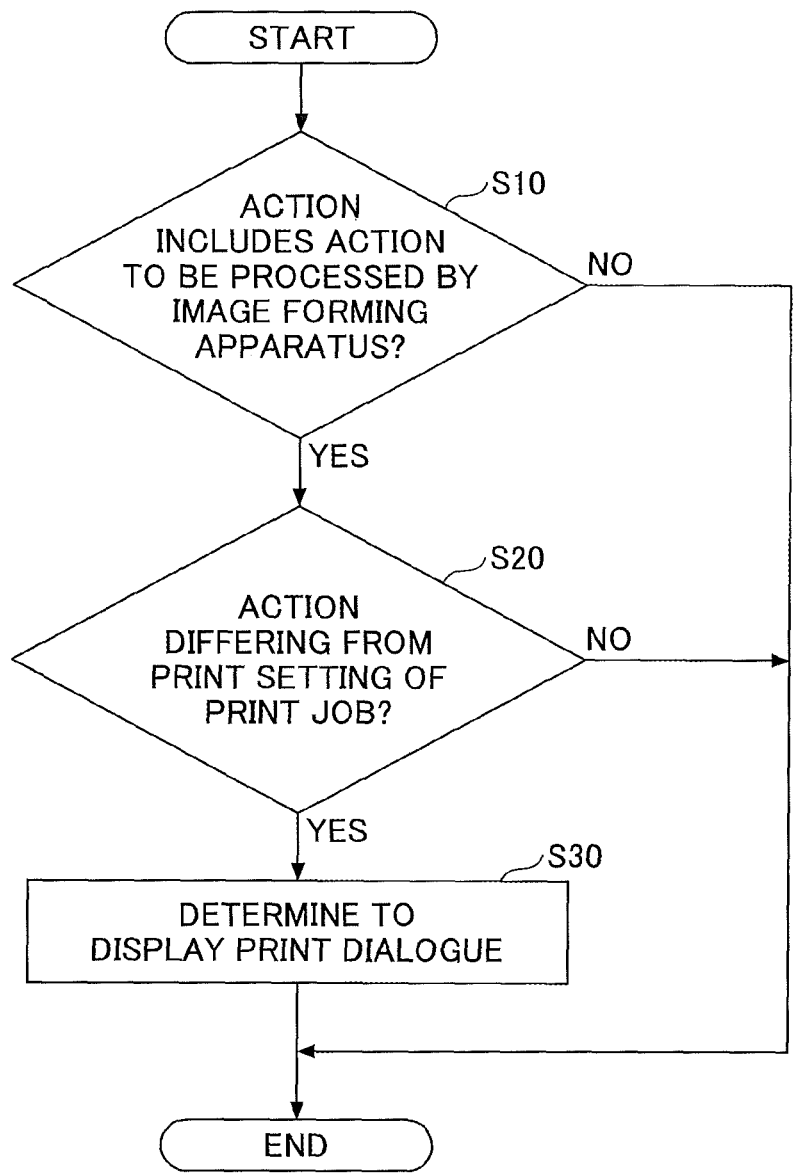

FIG.13

```xml
<?xml version="1.0" encoding="UTF-8" standalone="yes"?>
<getJobListResponse>
    <errorCode>000000000000</errorCode>
    <totalCount>3</totalCount>
    <jobList>
        <job>
            <creationTime>2015/01/27 09:47:23</creationTime>
            <id>0</id>
            <color>color</color>
            <copies>1</copies>
            <duplex>off</duplex>
            <name>JobName</name>
            <nup>2in1</nup>
            <pageCount>1</pageCount>
            <paperSize>A4</paperSize>
            <size>1</size>
            <actions>
                <action>notification</action>
            </actions>
        </job>
        <job>
            <creationTime>2015/01/27 09:47:23</creationTime>
            <id>1</id>
            <color>color</color>
            <copies>1</copies>
            <duplex>off</duplex>
            <name>JobName</name>
            <nup>2in1</nup>
            <pageCount>1</pageCount>
            <paperSize>A4</paperSize>
            <size>1</size>
            <actions>
            </actions>
        </job>
    </jobList>
</getJobListResponse>
```

FIG.17

```
<?xml version="1.0" encoding="UTF-8" standalone="yes"?>
<getJobListResponse>
    <errorCode>000000000000</errorCode>
    <totalCount>3</totalCount>
    <jobList>
        <job>
            <creationTime>2015/01/27 09:47:23</creationTime>
            <id>0</id>
            <color>color</color>
            <copies>1</copies>
            <duplex>off</duplex>
            <name>JobName</name>                  }4
            <nup>2in1</nup>
            <pageCount>1</pageCount>
            <paperSize>A4</paperSize>
            <size>1</size>
            <actions reEstimate = "required" expirationDate="">
            </actions>                                          ~10
        </job>
        <job>
            <creationTime>2015/01/27 09:47:23</creationTime>
            <id>1</id>
            <color>color</color>
            <copies>1</copies>
            <duplex>off</duplex>
            <name>JobName</name>                  }5
            <nup>2in1</nup>
            <pageCount>1</pageCount>
            <paperSize>A4</paperSize>
            <size>1</size>
            <actions reEstimate = "notRequired" expirationDate="2015/01/27 09:50:23">
                    <action>notification</action>
            </actions>                                          \10
        </job>
    </jobList>
</getJobListResponse>
```

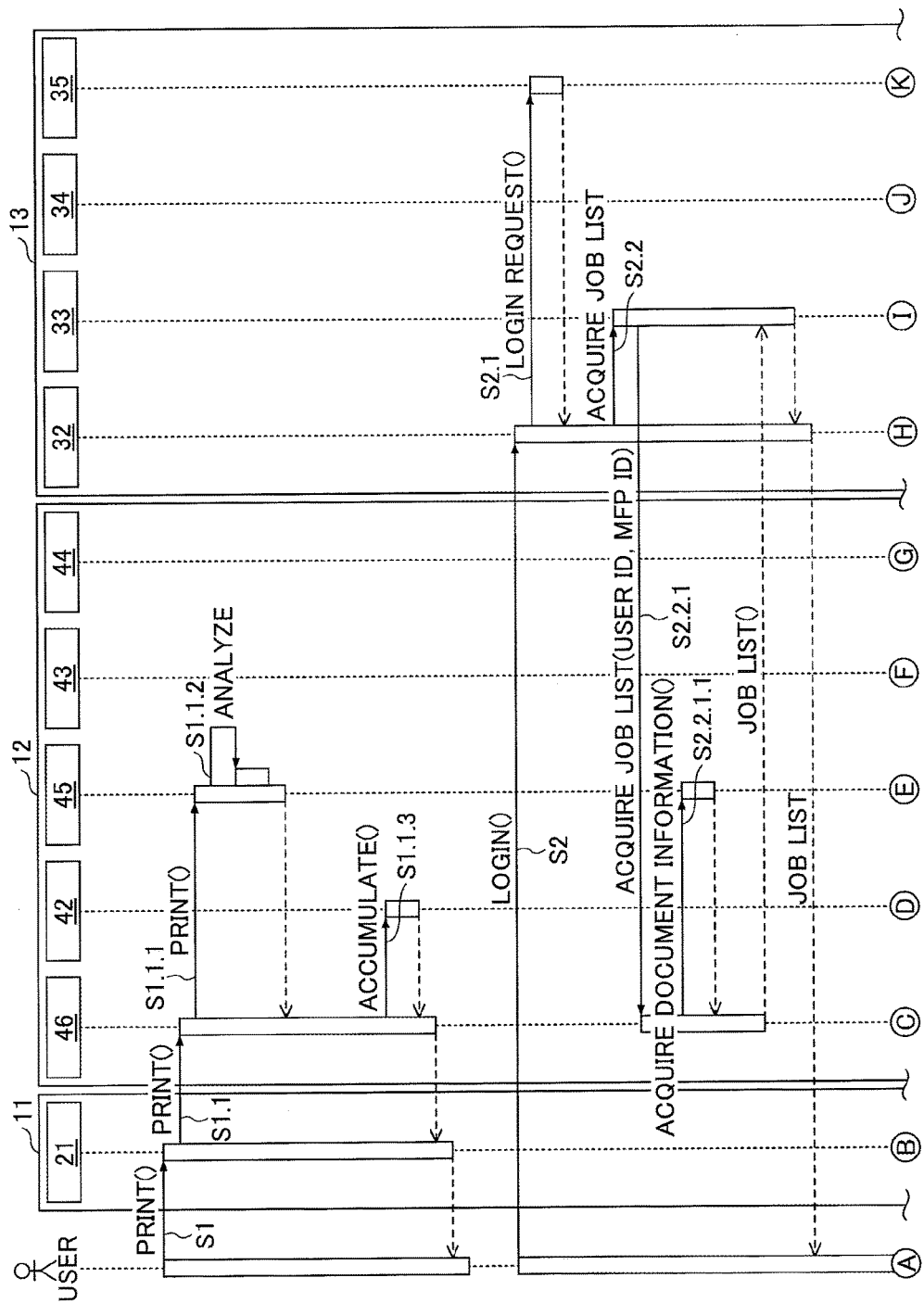

INFORMATION PROCESSING SYSTEM, INFORMATION PROCESSING APPARATUS, AND APPARATUS

CROSS-REFERENCE TO RELATED APPLICATIONS

The present application claims the benefit of priority under 35 U.S.C. § 119 of Japanese Patent Application No. 2015-177590, filed on Sep. 9, 2015, the contents of which are incorporated herein by reference in their entirety.

BACKGROUND OF THE INVENTION

1. Field of the Invention

The present disclosure relates to an information processing system, an information processing apparatus, and an apparatus.

2. Description of the Related Art

Push printing and pull printing are known in the art as printing configurations for users to use image forming apparatuses. Push printing is a printing configuration to print documents transmitted by terminals of users without accumulating the documents. Pull printing is a printing configuration to accumulate documents transmitted by terminals of users in a server or the like in advance to allow the users of the image forming apparatus to acquire the accumulated documents to print the documents when the users operate the image forming apparatus. Push printing has an advantage in terms of not requiring operations in the image forming apparatus, and pull printing has an advantage in terms of printing the documents at places the users desire to print and preventing the users from forgetting to collect the printed documents.

However, in the pull printing, functions of the image forming apparatus used by the users are not always compatible to the print settings when the users accumulate the documents in a server. In such a case, the users may obtain unintended print results. Japanese Patent No. 4905114 (Patent Document 1), for example, discloses a technology to transmit a report to indicate to a user whether the user is likely to obtain a desired print result that follows the user's intention. Japanese Patent No. 4905114 specifically discloses a print system capable of informing a user of printability when the image forming apparatus operated by the user print jobs may fail to print the accumulated print jobs without changing the print jobs. The user who has acquired the printability report is thus capable of acknowledging that the user will fail to obtain the intended print result.

RELATED ART DOCUMENT

Patent Document

Patent Document 1: Japanese Patent No. 4905114

SUMMARY OF THE INVENTION

According to an aspect of embodiments, there is provided an information processing system that includes a first information processing apparatus; and a second information processing apparatus that are coupled to each other via a network. The first information processing apparatus includes a first acquisition unit configured to acquire first data including second data, the second data indicating a process to be performed on the first data; a process information reader configured to read, when the first data satisfies a predetermined condition, process information in association with the predetermined condition from a storage; a transmitter configured to transmit, when the process information read from the process information reader includes predetermined process information, third data to the second information processing apparatus, the third data indicating the process information including the predetermined process information; and an editor configured to edit the second data in accordance with the process information read by the process information reader. The second information processing apparatus includes a second acquisition unit configured to acquire the third data from the first information processing apparatus, and a display unit configured to display on a display device indication that the second data are edited by the editor when the second acquisition unit acquires the third data.

Other objects, features and advantages of the present invention will become more apparent from the following detailed description when read in conjunction with the accompanying drawings.

BRIEF DESCRIPTION OF THE DRAWINGS

FIG. 7 is a diagram illustrating an example of a list of jobs acquired by the image forming apparatus in accordance with an embodiment;

FIG. 8 is a flowchart illustrating an example of a process of determining whether the image forming apparatus displays a print continuation dialogue on an operations part in accordance with an embodiment;

FIG. 13 is a diagram illustrating still another example of a list of jobs acquired by the image forming apparatus in accordance with an embodiment (the third embodiment);

FIG. 17 is a diagram illustrating further another example of a list of jobs acquired by the image forming apparatus in accordance with an embodiment (the fifth embodiment);

FIGS. 20A and 20B are a sequence diagram illustrating an example of a rule-based printing process performed by a print system in accordance with an embodiment (a seventh embodiment).

DETAILED DESCRIPTION OF THE PREFERRED EMBODIMENTS

There are printing systems incompatible to the rule-based printing technology. The users of such printing systems may thus acquire intended print results despite the rule-based printing being performed.

Rule-based printing is a printing technology to specify one of the rules that matches a corresponding one of operation statuses or a corresponding one of print settings of an image forming apparatus when a user operates the image forming apparatus and subsequently executes an action that is associated in advance with the specified rule.

The rule-based printing may be compatible both to the push printing and to the pull printing based on whether the specified rule matches the operation status or the specified print setting. In pull printing, the rule is applied in preference to the print setting that is applied by the user at the time of accumulating a document. Hence, the user may fail to acquire the intended print result according to an action associated with the rule despite the fact that the intended print result may be obtained according to the functions of the image forming apparatus. For example, it is assumed that the user's intended one of the print settings is "color printing". In pull printing, the user may be able to obtain an intended print result when the image forming apparatus operated by the user supports the color printing. However, when the rule includes the print setting "color printing" but an action to forcefully perform monochrome printing is associated with the rule, the user may fail to acquire a printability report. Thus, the user may obtain an unintended print result in this case.

According to an embodiment of the present invention, an information processing system is provided that is capable of allowing a user to acknowledge or recognize that the user will fail to acquire a print result intended by the user.

The following illustrates embodiments with reference to the accompanying drawings.

First Embodiment

Outline of Embodiment

Figure 1:
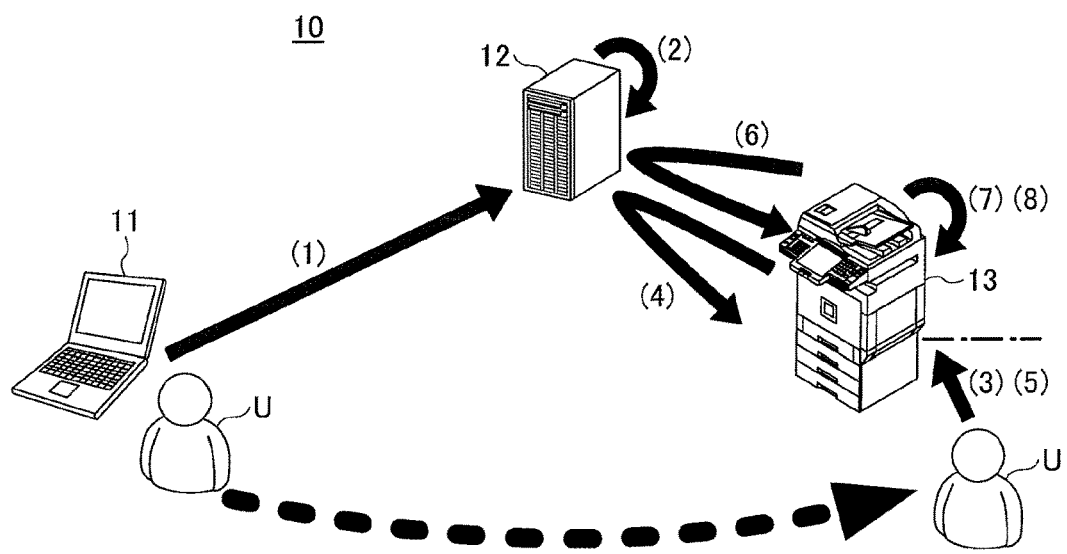
FIG. 1 is a system configuration diagram illustrating an example of a print system in accordance with an embodiment (a first embodiment)

FIG. 1 is a system configuration diagram illustrating an example of a print system 10 in accordance with a first embodiment. The following illustrates an outline of the print system 10 with reference to FIG. 1. Note that the print system 10 (an example of an information processing system) is configured to support a rule-based printing technology.

(1) A user personal computer (PC) 11 transmits print data (an example of first data) and print settings (an example of second data) to a print server 12.

(2) The print server 12 applies rules at a timing of receiving the print data; it is assumed that actions accumulated in the print server 12 are employed in this embodiment.

(3) A user U operates an image forming apparatus 13 to log into the image forming apparatus 13. The user U is identified by being logged into the image forming apparatus 13.

(4) The image forming apparatus 13 acquires a list of print jobs for which the user U has authorization. In this case, the print server 12 transmits to the image forming apparatus 13 an action determination result (an example of third data) indicating whether the rule matching document information acquired from a print job or the later-described information subject to application is associated with an action (an action to prompt the user U to check a print result) to be processed by the image forming apparatus 13.

(5) The user U subsequently selects a print job subject to printing to execute printing of the selected print job.

(6) The image forming apparatus 13 that has received the action determination result transmits a rule evaluation request to the print server 12. The print server 12 specifies the actions associated with the rules matching the document information or the information subject to application and transmits the specified action to the image forming apparatus 13.

(7) When the action does not match the print settings, the image forming apparatus 13 transmits, to the user U, a report indicating that the action does not match the print settings. The user U may be able to check or acknowledge that the user U appears to fail to acquire the intended print result.

(8) When the user U inputs indication to continue printing, the image forming apparatus 13 executes printing in accordance with the action.

As described above, the print system 10 according to the embodiment is capable of transmitting a report indicating that the user appears to fail to acquire the intended print result, utilizing the action associated with the rules matching the document information or the information subject to application.

Definitions

Rule-based printing is a printing configuration in which the image forming apparatus 13 performs a process based on an action associated with rules matching document information or information subject to application. Although the rule-based printing configuration includes the term "printing", the rule-based printing covers scanning, facsimile transmission, information processing without mechanical operations, or accumulation of data in a storage medium.

The document information is acquired from at least one of the print settings and the print data. The document information is compared with the rules. Examples of the document information include the number of pages, a file name, a keyword included in the print data, and the like.

The information subject to application is compared with the rules other than the document information. Examples of the information subject to application include a user name, a time to perform pull printing, a day of the week, date, and a model of the image forming apparatus 13. The information applied to the rules is not limited to the document information or the information subject to application. The information applied to the rules may be any information insofar as the information is acquired by the image forming apparatus 13 or the print server 12 and is applicable to the rules.

The rule is a condition for determining an action (an example of process information) to be performed on at least one of the document information and the information subject to application. The actions are processes performed by the image forming apparatus 13. The details of the rules and actions will be described later. Note that the action determined by the rule is processed in preference to the action determined by the print settings when the user U accumulates print data in the print server 12.

System Configuration

Figure 2:
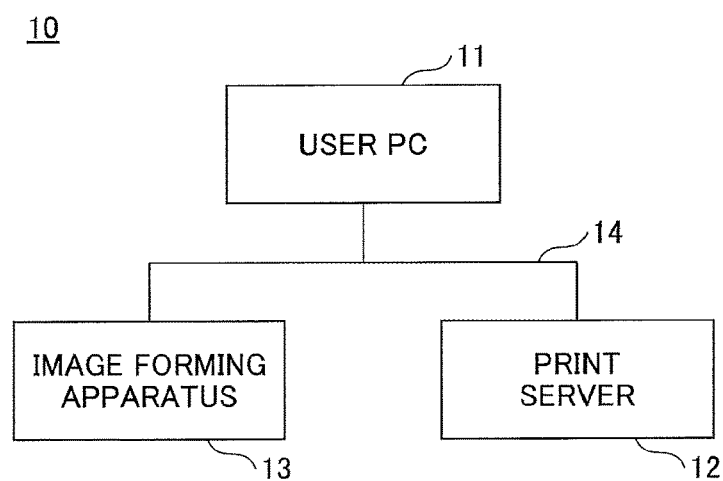
FIG. 2 is a hardware configuration diagram illustrating an example of a print system in accordance with an embodiment.

The following illustrates the print system 10 with reference to FIG. 2. FIG. 2 is a configuration diagram illustrating an example of the print system 10 in accordance with the first embodiment. The print system 10 includes a user PC 11 coupled to a network 14, an image forming apparatus 13, and a print server 12.

The network 14 includes at least one of an in-house local area network (LAN) such as LAN inside a company where the image forming apparatuses 13 are disposed, a provider network that couples the LAN to the Internet, and a communications line provided by the line service provider. The network 14 may include a wide area network (WAN) having multiple LANs or the Internet. The he network 14 may nave wired or wireless construction, or a combination of wired and wireless constructions.

The user PC 11 is a terminal operated by the user U to transmit print data to the print server 12. The user PC 11 runs application software and stores document data created by the application software. A printer driver converts the document data into print data (page description language (PDL) data) and transmits the print data to the print server 12. Alternatively, the user PC 11 may directly transmit to the print server 12 the document data handled by the print server 12 without conversion. In this case, the user PC 11 does not necessarily include the application software or the printer driver. The print data and the document data are not separately illustrated but uniformly described as the print data in this embodiment.

Examples of the user PC 11 include a personal computer (PC), a tablet terminal, a smartphone, a wearable computer, a TV conference terminal, an electronic whiteboard, a projector, a car navigation terminal, a camera, and a game machine.

The print server 12 is an information processing apparatus configured to control print jobs in association with rule-based printing. The print job is a process to be performed using the print data. The print job involves a process other than the printing process described above. The print server 12 may only have functions as the information processing apparatus; that is, the print server 12 may, for example, be a multifunction peripheral, a TV conference terminal, an electronic whiteboard, or a projector, other than the information processing apparatus. The print server 12 may apply the rules when receiving the print data, optionally accumulate print jobs, or edit the print settings in accordance with the associated action. The print server 12 may further apply the rules when executing pull printing, and edits a desired one of the print settings as an action.

Note that the print server 12 may be an on premise server or a server provided as a cloud service. The print server 12 may have functions other than the print server 12. The print system 10 may include two or more print servers 12. The print server 12 may be virtualized by a so-called virtualization technology.

The image forming apparatus 13 is an apparatus having a client function for the print server 12. The image forming apparatus 13 may be called a "printer". The image forming apparatus 13 may be a scanner apparatus, a facsimile machine, or a multifunction peripheral (MFP). The image forming apparatus 13 may be a simple information processing apparatus capable of executing actions, other than the above-described apparatuses exhibiting mechanical operations. The image forming apparatus 13 serving as such information processing apparatus may perform a process such as an image process (e.g., OCR, translation, and person recognition) on the print data, to accumulate the processed print data in the print server 12 again.

The client function of the image forming apparatus 13 may be a main body function of the apparatus or an extended function developed by software development kit (SDK) and the like. The client function of the image forming apparatus 13 may be provided by other apparatuses (e.g., a smartphone, a tablet, and a personal computer (PC)). In such a case, the image forming apparatus 13 may perform communications with the print server 12 via another apparatus.

Hardware Configuration

Print Server

Figure 3:
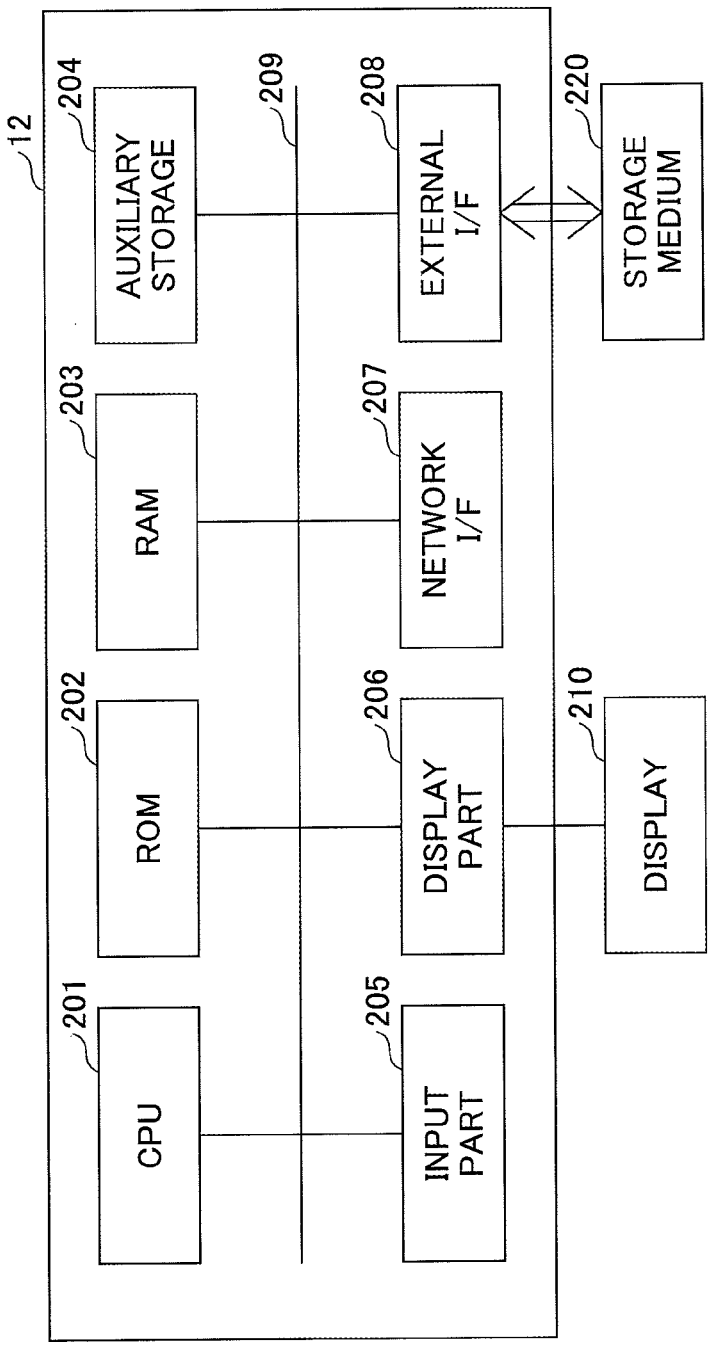
FIG. 3 is a hardware configuration diagram illustrating an example of a print server in accordance with an embodiment.

FIG. 3 is a hardware configuration diagram illustrating an example of the print server 12. The print server 12 includes a central processing unit (CPU) 201, a read only memory (ROM) 202, a random access memory (RAM) 203, and an auxiliary storage 204. The print server 12 further includes an input part 205, a display part 206, a network I/F 207, and an external I/F 208. Note that the above-described components of the print server 12 are mutually coupled to one another via a bus 209. Accordingly, the print server 12 has functions of the information processing apparatus.

The CPU 201 is configured to execute various types of programs (e.g., a server-specific program, and an operating system) stored in the auxiliary storage 204. The input receiver 202 is a nonvolatile memory, and the ROM 202 may store various types of programs such as initial program loader (IPL), setting data, and the like.

The RAM 203 is a storage such as a dynamic random access memory (DRAM) or static random access memory (SRAM). The RAM 203 serves as a work area in which, when executed by the CPU 201, various types programs in the auxiliary storage 204 are loaded.

The auxiliary storage 204 stores various types of databases used by various types of programs when executed by the CPU 201 or when executing various types of programs. The auxiliary storage 204 is a nonvolatile memory such as a hard disk drive (HDD) or a solid state drive (SSD). Note that various types of databases will be described later.

The input part 205 is an interface for an operator to input various types of instructions into the print server 12. The input part 205 includes one or more of a keyboard, a mouse, a touch panel, and a voice input device.

The display part 206 is configured to display various types of information included in the print server 12 in a form of a cursor, a menu, a window, characters, or images of the display 210, in response to a request from the CPU 201. The display part 206 may be graphic chips or a display I/F.

The network I/F 207 is a communications apparatus configured to perform communications with the image forming apparatus 13 via the network 14.

The external I/F 208 is an interface configured to couple the print server 12 to a storage medium 220 or an external apparatus. Examples of the external I/F 208 include a universal serial bus (USB) interface and a near field wireless communications apparatus. Note that examples of the storage medium 220 include a USB memory, a digital versatile disk (DVD), and a compact disk (CD).

Note that the user PC 11 is assumed to have a hardware configuration similar to the hardware configuration of the print server 12. The hardware configuration of the user PC 11 is not completely identical to the hardware configuration of the print server 12; however, the difference between the hardware configurations of the user PC 11 and the print server 12 will not affect the illustrating the embodiment.

The hardware configuration of the print server 12 and the like illustrated in FIG. 3 does not necessarily have physical hardware components housed in a case or physical hardware components bundled as an apparatus; however, the hardware configuration of the print server 12 merely represents hardware-like components preferably included in the print server 12. In order to be compatible to cloud computing, the physical configuration of the print server 12 of the embodiment and the like is not necessarily a statically fixed configuration but may instead be dynamically changing configuration having resources coupled or decoupled according to load imposed.

Image Forming Apparatus 13

Figure 4:
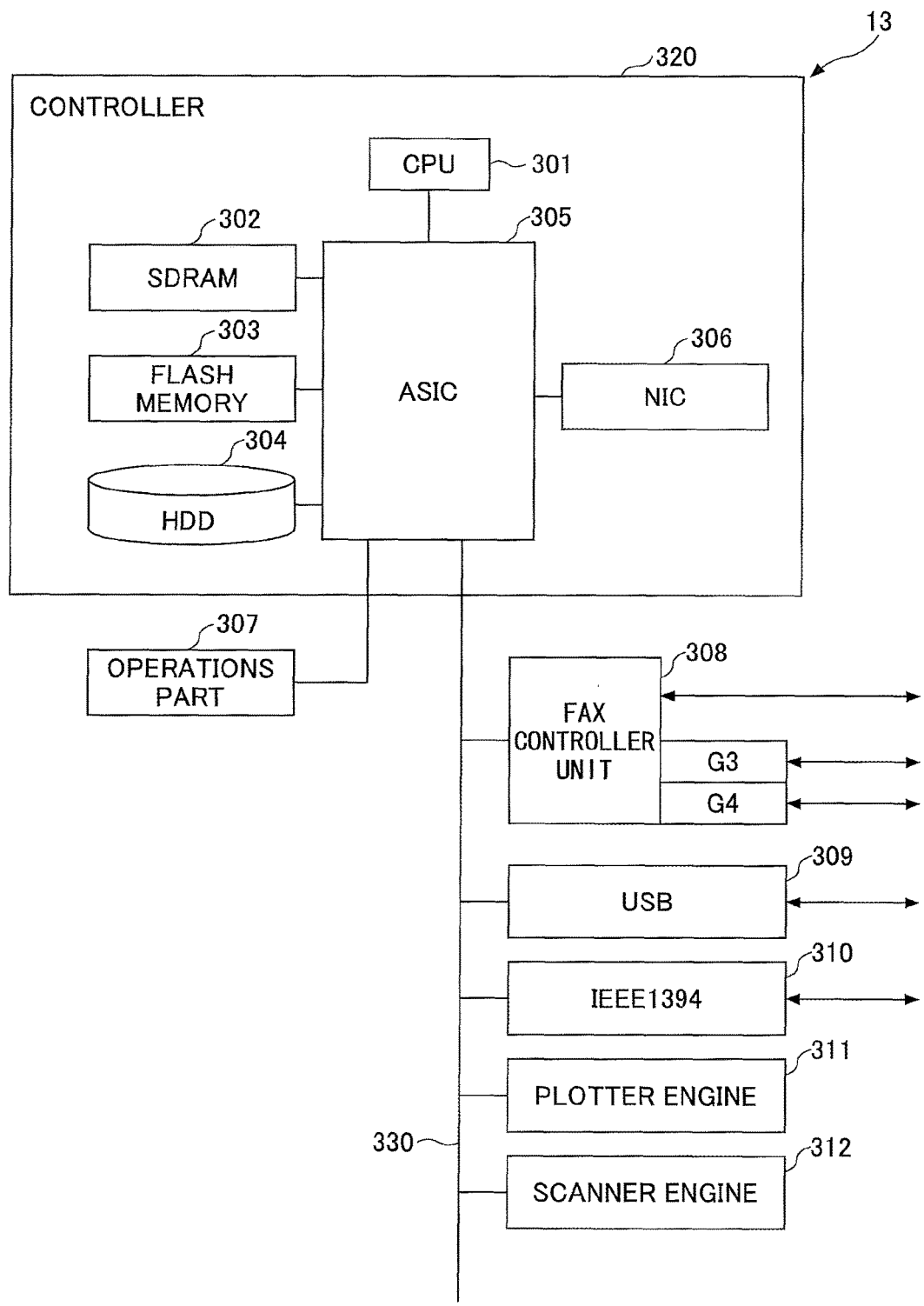
FIG. 4 is a hardware configuration diagram illustrating an example of an image forming apparatus in accordance with an embodiment.

FIG. 4 is a hardware configuration diagram illustrating an example of the image forming apparatus 13. The image forming apparatus 13 includes a controller 320. The controller 320 includes a CPU 301, an application specific integrated circuit (ASIC) 305, an SDRAM 302, a flash memory 303, an HDD 304, and a network interface card (NIC) 306.

The ASIC 305 is a multifunctional device board having a CPU interface, an SDRAM interface, a local bus interface, a PCI bus interface, a media access controller (MAC), and an HDD interface.

The CPU 301 is configured to read various types of programs (e.g., an access management program) from the HDD 304 via the ASIC 305 to execute the read programs.

The SDRAM 302 may serve as a program memory configured to store various types of programs or as a work memory when the CPU 301 executes various types of programs. Note that DRAM or SRAM may be used instead of the SDRAM 302.

The flash memory 303 is a nonvolatile memory configured to store a boot loader (a boot program) activating the image forming apparatus 13 or an OS. The flash memory 303 also serves as an application memory configured to store various application software (e.g. an access management program). The flash memory 303 serves as a service memory configured to store various services (e.g., a copy service, a print service, and a facsimile service). The flash memory 303 further serves as a firm memory configured to store firmware or data memory configured to store a network address, and point setting information configured to store a model type, a serial number setting, and the number of points.

Note that a nonvolatile RAM integrating backup circuits utilizing a RAM and batteries or another nonvolatile memory such as an electrically erasable programmable read-only memory (EEPROM) may be used instead of the flash memory 303.

The HDD 304 is a nonvolatile storage medium configured to store data regardless of ON or OFF of the power supply of the image forming apparatus 13. The HDD 304 is configured to record programs and data other than the programs and data stored in the flash memory 303. Note that the HDD 304 may be used as a firm memory.

The NIC 306 is an interface configured to perform communications with the print server 12 via the network 14. An example of the NIC 306 may be an Ethernet (registered trademark) card.

The controller 320 is coupled to the operations part 307. The operations part 307 includes various types of operations keys, a liquid crystal display (LCD) serving as a display device or a CRT character display, and a touch panel. The operations part 307 is used by the user U to input various types of instructions into the image forming apparatus 13.

The controller 320 is further coupled to a fax controller unit 308, a USB 309, an "IEEE 1394" 310, a plotter engine 311, and a scanner engine 312 via a PCI bus 330. The image forming apparatus 13 may thus be able to provide various services including a copy service, a print service, and facsimile service. The plotter engine 311 may adopt electrophotography or an inkjet system.

Note that the configuration illustrated in FIG. 4 is only an example, and hence, the hardware configuration of the image forming apparatus 13 is not limited to the hardware configuration illustrated in FIG. 4. For example, the NIC 306 may be coupled to the PCI bus 330. The NIC 306 may be coupled to the network 14 by wire or may be wirelessly coupled to the network 14 via Wi-Fi (registered trademark).

The image forming apparatus 13 may further include a digital service unit (DSU) or a modem coupled to a telephone network instead of or in addition to the NIC 306. The image forming apparatus 13 may further include a communications apparatus configured to connect the image forming apparatus 13 to a mobile telephone network. The image forming apparatus 13 may further include a device configured to perform communications by a communications standard called "Bluetooth (registered trademark)" to be coupled via the device to the network 14.

Functional Configuration

Figure 5:
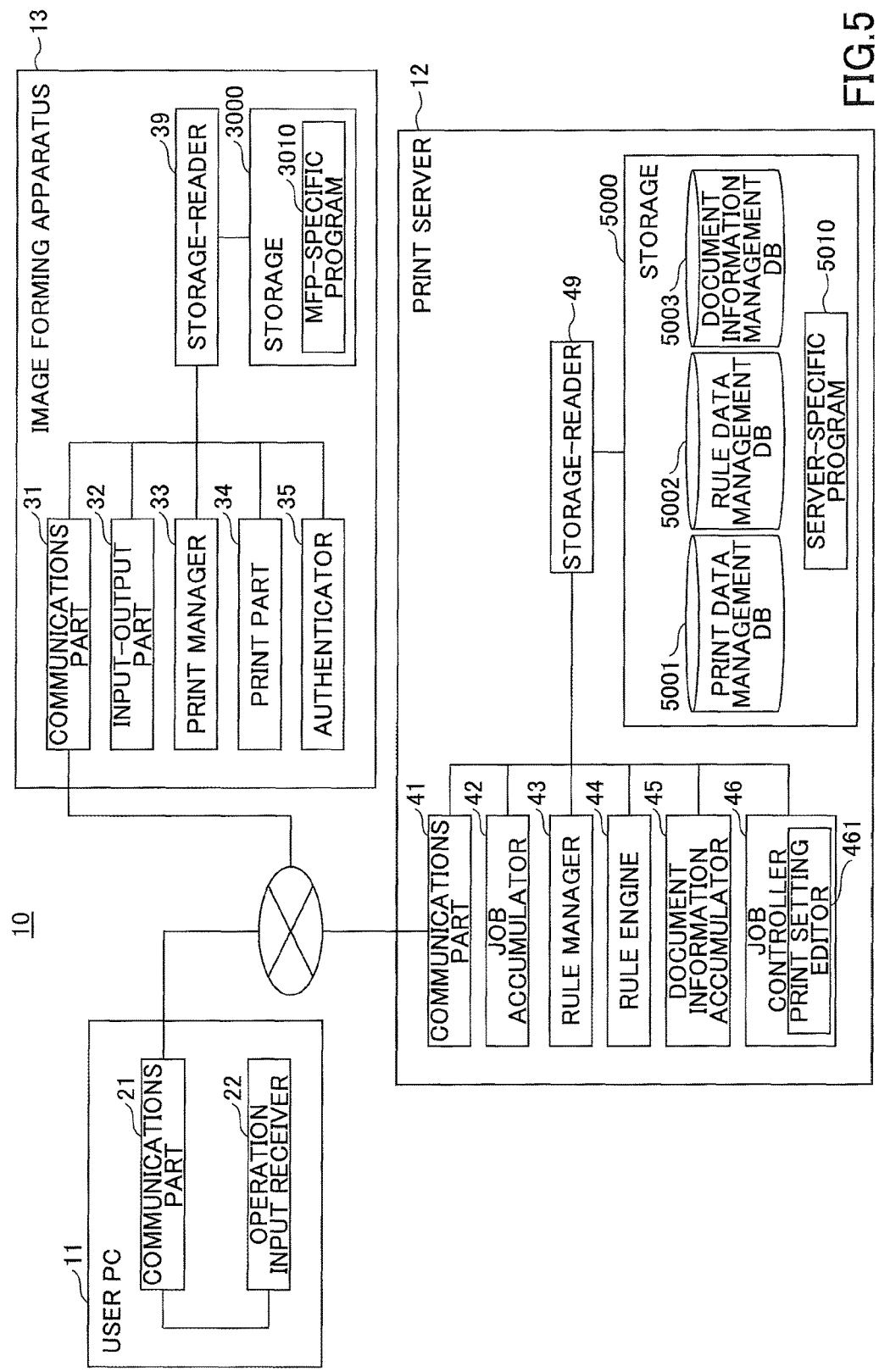
FIG. 5 is a functional block diagram illustrating an example of the print system in accordance with an embodiment.

FIG. 5 is a functional block diagram illustrating an example of the print system 10 in accordance with the first embodiment. The following illustrates respective functions of the user PC 11, the print server 12, and the image forming apparatus 13.

User PC 11

The user PC 11 includes a communications part 21 and an operation input receiver 22. The above-described functional parts are implemented by causing any one of the components illustrated in FIG. 3 to operate instructions from the CPU 201 in accordance with the programs stored in the auxiliary storage 204 or the ROM 202. The programs to be executed by the user PC 11 are provided as application programs to implement the client functions for the print server 12.

The communications part 21 of the user PC 11 may be implemented by the CPU 201, the network I/F 207, and the like illustrated in FIG. 3. The communications part 21 of the user PC 11 is configured to transmit the print data to the print server 12 via the network 14. The print data may be transmitted utilizing a printer sharing system provided by protocols including a server message block (SMB) and a common Internet file system (CIFS) a printer sharing protocol or utilizing general protocols such as Http/Https.

The operation input receiver 22 may be implemented by the CPU 201, the input part 205, and the like illustrated in FIG. 3. The operation input receiver 22 is configured to receive various types of inputs and operations performed by the user U. The operation input receiver 22 may receive the selection of the print data made by the user U.

Print Server 12

The following illustrates a functional configuration of the print server 12. The print server 12 includes a communications part 41, a job accumulator 42, a rule manager 43, a rule engine 44, a document information accumulator 45, a job controller 46, and a storage-reader 49. The above-described functional parts are implemented by causing any one of the components illustrated in FIG. 4 to operate instructions from the CPU 201 in accordance with the server-specific program 5010 stored in the auxiliary storage 204 or the ROM 203.

The print server 12 includes a storage 5000 having one or more of the ROM 202, the RAM 203, and the auxiliary storage 204 illustrated in FIG. 4. The storage 5000 stores a print data management DB 5001, a rule data management DB 5002, a document information management DB 5003, and a server-specific program 5010. The server-specific program 5010 may be distributed in a form stored in the storage medium 220 or downloaded from a server distributing the program.

Initially, an illustration is given of various types of databases stored in the storage 5000.

Print Data Management DB 5001

TABLE 1

| ID | USER ID | DOCUMENT NAME | SIZE | NUMBER OF PAGES | path |
|---|---|---|---|---|---|
| 1 | User1 | DOCUMENT.doc | 123 | 30 | file://path/data1.dat |
| 2 | User3 | SPREADSHEET.xls | 45 | 20 | file://path/data2.dat |
| 3 | User3 | PRESENTATION.doc | 135 | 15 | file://path/data3.dat |
| 4 | User1 | MAIL | 195 | 1 | file://path/data4.dat |
| 5 | User1 | IMAGE.png | 345 | 2 | file://path/data5.dat |

The storage 5000 includes the print data management DB 5001 formed of a print data management table illustrated in Table 1. The print data management table includes an "ID" of the print data in association with a "user ID", a "document name", a "size", the "number of pages", and "path". The ID of the print data is identifier information for uniquely identifying the print data. The user ID is identifier information for uniquely identifying the user U in the print system 10. The document name is a file name that the user U has assigned to the print data (document). The size is a size of the print data (e.g., measured in terms of bytes). The number of pages is the number of sheets of the print data (e.g., a single side corresponds to one page). A path is an uniform resource identifier (URI) of location where the print data are accumulated.

The print data management table is updated every time the print data are transmitted from the user PC 11. The print data that have been printed may be deleted or continuously accumulated by registering a print completed status of the print data.

The various types of identifier information used in this embodiment may be a language, characters, symbols, or various types of marks, or a combination of at least two more of a language, characters, symbols, and various types of marks.

Rule Data Management DB 5002

TABLE 2

| ID | TARGET USER | TARGET APPARATUS | RULE |
|---|---|---|---|
| 1 | User1, User2 | — | RULE DATA 1 |
| 2 | UserGroup1, UserGroup2 | MFP1 | RULE DATA 2 |
| 3 | — | LP1 | RULE DATA 3 |
| 4 | User3, UserGroup2 | MFP2 | RULE DATA 4 |
| 5 | User4 | MFPGroup1 | RULE DATA 5 |

The storage 5000 includes a rule data management DB 5002 having a rule data management table illustrated in Table 2. The rule data management table includes an "ID" of rule data in association with a "target user", a "target apparatus", and "rule data". The ID of the rule data is identifier information for uniquely identifying the rule data. The target user indicates a user ID to which the rules are applied or a group ID of a group to which the user U belongs. The group to which the user U belongs is called a division or a unit of action, and the group ID is identified by the user ID. The target apparatus (an example of an apparatus) is the image forming apparatus 13 to which the rules are applied or a group of image forming apparatuses 13. The target apparatus may be provided with identifier information of the image forming apparatus 13 or identifier information of the group of the image forming apparatuses 13.

The target user and the target apparatus is examples of information subject to application. It is not necessary to set the target user and the target apparatus. When the target user is not set, all the rule data may be applied regardless of the users. When the target apparatus is not set, all the rule data may be applied regardless of the image forming apparatuses 13.

The rule data in Table 2 are illustrated with reference to Tables 3 to 5. The rule data includes rules and actions associated with the rules.

TABLE 3

| ITEM | COMPARISON | VALUE SUBJECT TO COMPARISON |
|---|---|---|
| NUMBER OF PAGES | GREATER THAN OR EQUAL TO/LESS THAN OR EQUAL TO | NUMBER |
| SIZE | GREATER THAN OR EQUAL TO/LESS THAN OR EQUAL TO | NUMBER |
| COLOR | EQUAL TO | COLOR/MONOCHROME |
| BOTH SIDES | EQUAL TO | SINGLE SIDE/BOTH SIDES |
| JOB NAME | EQUAL TO/START WITH/END WITH/INCLUDE | ANY CHARACTER STRING |
| DAY OF THE WEEK | EQUAL TO | MON/TUES/WED/THURS/FRI/SAT/SUN |
| TIME | RANGE | TIME |
| DIVISION OF USER | EQUAL TO/START WITH/END WITH/INCLUDE | ANY CHARACTER STRING |

Table 3 illustrates examples of rules described in the rule data. The "item" indicates information applied to the rules. The information given as the item includes information extracted from the document information and information subject to application acquired from a calendar or a clock.

The above-described information given as the item is only an example. The "comparison" indicates how the values of the items are compared. For example, when the item is the number of pages, the number of pages of the print data is compared, for example, with being greater than or equal to, or being less than or equal to a certain number of pages. Note that Table 3 does not form the rule data management table. Table 3 is a table for description.

TABLE 4

| ACTION | DETAILS |
|---|---|
| CONFIRM | DISPLAY POPUP MESSAGE TO PROMPT USER TO SELECT WHETHER TO PRINT BEFORE PRINTING |
| REJECT | ABORT PRINT JOB SO AS NOT TO PERFORM PRINTING |
| HOLD | RETAIN PRINT JOB FOR PULL PRINTING |
| REDIRECT | TRANSMIT PRINT JOB TO OTHER PRINTER |
| FORCEFUL MONOCHROME | CHANGE TO MONOCHROME AT PRINTING |
| FORCEFUL BOTH SIDES | CHANGE SINGLE SIDE TO BOTH SIDES |

Table 4 illustrates examples of actions described in the rule data. The action is provided with an "action name", Table 4 illustrates content (details) of each action. For example, the action having an action name "check" indicates displaying a popup message to prompt the user U to select whether to execute printing before printing. The above-described action is an example of predetermined process information, indicating an action necessary to be processed by the image forming apparatus 13. When the document information or the information subject to application matches the rule, the print server 12 transmits an instruction to the image forming apparatus 13 to execute this action. Note that Table 4 does not form the rule data management table. Table 4 is a table for description.

TABLE 5

```
<rules>
  <rule name="rule1" id="1">
    <association>
      <user>User1</user>  } 1
      <user>User2</user>
    </association>
    <criteria>
      <matchAll>
        <criterion type="page" compare="moreThan",
          value="10"/>                                        } 2
        <criterion type="color" compare="equals",value="color"/>
      </matchAll>
    </criteria>
    <actions>
      <action type="confirmation"/>
```

TABLE 5-continued

```
      <action type="forceMono"/>  } 3
    </action>
  </rule>
</rules>
```

Table 5 illustrates an example of the rule data corresponding to "ID=1" in the rule data management table. Note that the rule data corresponding to "ID=1" in the rule data management table are described in an XML format. In Table 5, the description 1 includes target users "User1" and "User2". The "User1" and "User2" are information subject to application, and the rule data in Table 5 thus includes information subject to application.

The description 2 includes rules. In this example, the rules specify the number of pages being greater than or equal to "10", and the color of the print setting being "color". The description 3 includes actions. In this example, the actions specify the confirmation and the forceful monochrome illustrated in Table 4. The rule data includes the rules in association with the respective actions.

The print server 12 extracts document information from the print data, and acquires information subject to application from the print server 12 or the image forming apparatus 13 to determine whether the document information or information subject to application matches the rules of the descriptions 1 and 2 of the rule data. When the document information or information subject to application matches the rules of the descriptions 1 and 2 of the rule data, the print server 12 edits the print setting of the action of the description 3 or adds a process content in the action of the description 3 and transmits an instruction to the image forming apparatus 13 to execute the actions.

Note that the description 2 is specified by the tag <matchAll>, and whether the description 2 matches all the rules is determined. Note that a tag for determining whether the description 2 matches one or more of the rules is also prepared.

The rule data may be written in a format or a language handled by the print server 12. For example, the rule data may be written by a relational database management system (RDMBS). The administrator in this case may register the actions in association with the contents of Table 3 in the RDMBS.

The rule data may include the rules that are coupled in series in a row. In such a description format, the determination is performed in the order from the top of the rules, and when the rule matches the document information or the information subject to application, the action in association with that rule is applied. Alternatively, the rules may be written in combinations of sequential processes and braches such as a flowchart or a workflow. In this case, the action achieved via sequential process and branches is applied.

Document Information Management DB 5003

TABLE 6

| ID | NUMBER OF PAGES | SIZE | COLOR | BOTH SIDES | AGGREGATE | JOB NAME | NUMBER OF SETS | MAGNIFICATION | SHEET SIZE |
|---|---|---|---|---|---|---|---|---|---|
| 1 | 30 | 123 | COLOR | SINGLE SIDE | 2in1 | DOCUMENT.doc | 1 | 1 | A4 |
| 2 | 20 | 45 | MONOCHROME | SINGLE SIDE | 2in1 | SPREADSHEET.xls | 1 | 1 | A4 |

The storage 5000 includes a document information management DB 5003 including a document information management table illustrated in Table 6. The document information management table accumulates document settings extracted from the print settings and the print data. For example, the document information management table registers an "ID", a "number of pages", a "size", "color", "both sides", "aggregate", a "job name", a "number of sets", "magnification", and a "sheet size" of the print data. The print server 12 that has received the print data from the user PC 11 extracts such document information from the print data.

Functions of Print Server 12

The following illustrates respective functions of the print server 12. The communications part 41 of the print server 12 may be implemented by the CPU 201, the network I/F 207, and the like illustrated in FIG. 3. The communications part 41 of the print server 12 is configured to receive the print data to the user PC 11 via the network 14.

The job accumulator 42 may be implemented by the CPU 201 illustrated in FIG. 3. The job accumulator 42 is configured to store the print data in the print data management DB 5001. Specifically, the job accumulator 42 may be a file system or RDBMS of the print server 12 itself or may be an external file server, a cloud storage service, or the like.

The rule manager 43 may be implemented by the CPU 201 illustrated in FIG. 3. The rule manager 43 is configured to manage the rule data management table of the rule data management DB 5002. For example, the rule manager 43 receives new registration, edition, deletion, and the like of a record of the rule data management table from the administrator and registers the received registration, edition, deletion, and the like of the record in the rule data management table. The rule manager 43 acquires rule data that satisfy the document settings or the information subject to application from the rule data management DB 5002. Specifically, the rule manager 43 utilizes RDBMS or a file system (e.g., the above-described XML file).

The rule engine 44 may be implemented by the CPU 201 illustrated in FIG. 3. The rule manager 43 is configured to determine an action described in the rule data that match the document information or the information subject to application.

The document information accumulator 45 may be implemented by the CPU 201 illustrated in FIG. 3. The document information accumulator 45 is configured to acquire the document information from at least one of the print data and the print settings and register the acquire document information in the document information management DB 5003.

The job controller 46 may be implemented by the CPU 201 illustrated in FIG. 3. The job controller 46 is configured to control overall rule-based printing. For example, the job controller 46 may create a list of the print jobs from the accumulated print data to transmit the created list of the print jobs to the image forming apparatus 13 or transmit the print data to the image forming apparatus 13. The job controller 46 may acquire the information subject to application from the print server 12 or the image forming apparatus 13. The job controller 46 may further include a print setting editor 461. The print setting editor 461 is configured to edit the print settings in accordance with the action determined by the rule engine 44.

The storage-reader 49 may be implemented by the CPU 301, the auxiliary storage 204, and the like illustrated in FIG. 3. The storage-reader 49 is configured to store various types of data in the storage 5000 and read various types of data stored in the storage 5000.

Image Forming Apparatus 13

The following illustrates respective functions of the image forming apparatus 13. The image forming apparatus 13 includes a communications part 31, an input-output part 32, a print manager 33, a print part 34, an authenticator 35, and a storage-reader 39. The above-described functional parts are implemented by causing any one of the components illustrated in FIG. 4 to operate instructions from the CPU 201 in accordance with the MFP-specific program 3010 stored in the HDD 304 or the SDRAM 302.

The image forming apparatus 13 includes a storage 3000 having one or more of the SDRAM 302, the flash memory 303, and the HDD 304 illustrated in FIG. 4. The storage 3000 stores the MFP-specific program 3010. The MFP-specific program 3010 may be distributed in a form stored in the storage medium 220 or downloaded from a server distributing the program.

Functional Configuration of Image Forming Apparatus 13

The communications part 31 of the image forming apparatus 13 may be implemented by the CPU 301, the NIC 306, and the like illustrated in FIG. 4. The communications part 31 is configured to receive print data and the like from the print server 12 via the network 14.

The input-output part 32 may be implemented by the CPU 301, the operations part 307, and the like illustrated in FIG. 4. The input-output part 32 is configured to receive various types of inputs and operations performed by the user U. The input-output part 32 may display information (e.g., a job list) for the user U on an LCD of the operations part 307.

The print manager 33 may be implemented by the CPU 301 and the like illustrated in FIG. 4. The print manager 33 is configured to acquire a list of jobs (hereinafter also called a "job list") and print data from the print server 12. The print manager 33 may output the acquired print data to the print part 34. The print manager 33 is configured to control overall rule-based printing. The print manager 33 is configured to acquire an action based on the action determination result, and prompt the user to check whether the user desires to continue printing based on the acquire action.

The print part 34 may be implemented by the CPU 301, the plotter engine 311, and the like illustrated in FIG. 4. The print part 34 is configured to print the print data on a sheet of paper or the like.

The authenticator 35 may be implemented by the CPU 301 and the like illustrated in FIG. 4. The authenticator 35 is configured to authenticate or identify the user U. For example, the authenticator 35 authenticates the user U by verifying whether a combination of a user name (user ID) and a password (hereinafter called a "user name (user ID) and password combination") matches a combination of a user name (user ID) and a password held by the authenticator 35. Alternatively, the authenticator 35 may authenticate the user U by causing a card reader to read an IC card. The authenticator 35 may authenticate the user U by biometrics. The authenticator 35 may delegate an external authentication server to authenticate the user U instead of the image forming apparatus 13.

The storage-reader 39 may be implemented by the CPU 301, the HDD, and the like illustrated in FIG. 4. The storage-reader 39 is configured to store various types of data in the storage 3000 and read various types of data stored in the storage 3000.

Operation Process

Introducing Print Data

Figure 6A:
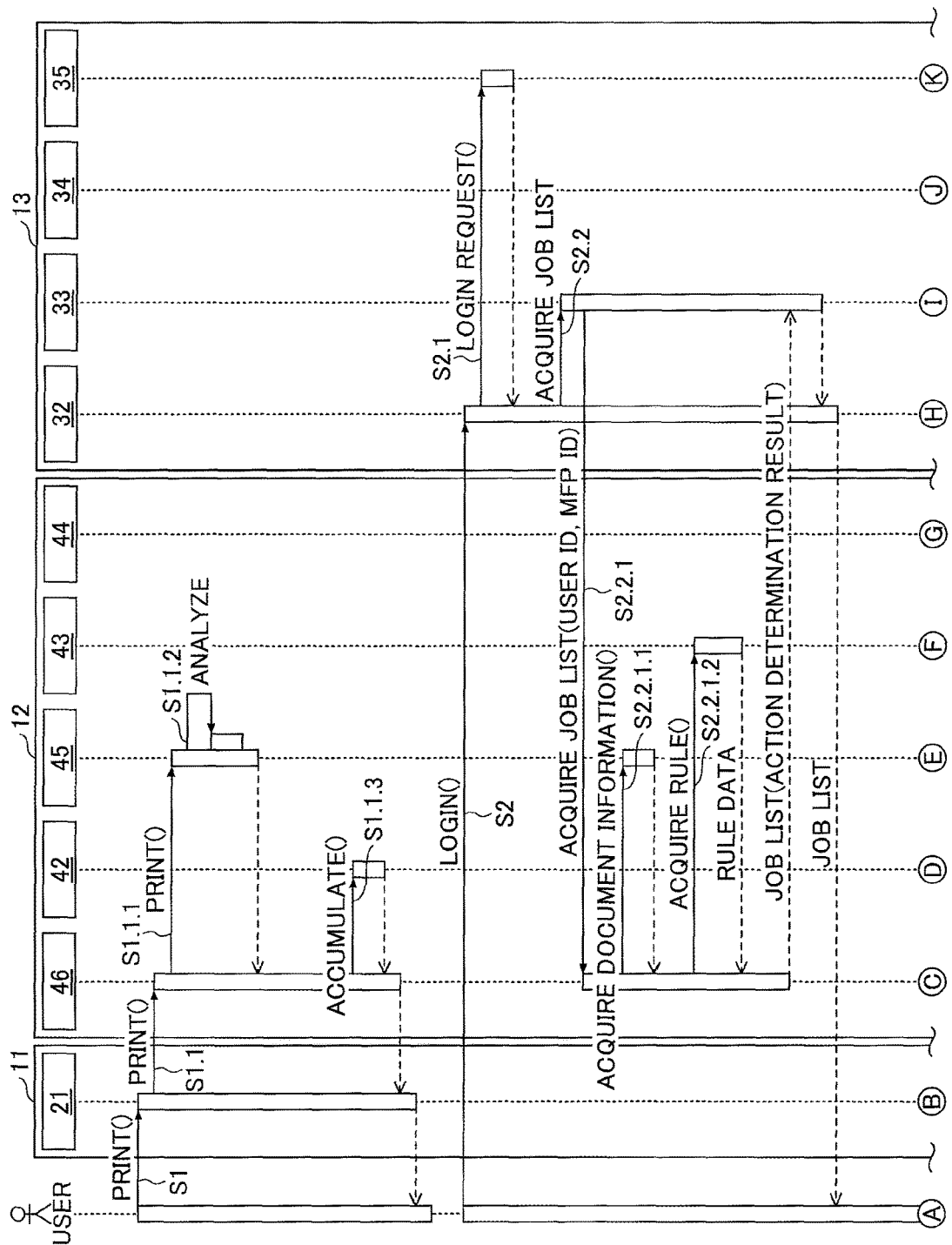
FIGS. 6A and 6B are a sequence diagram illustrating an example of a rule-based printing process performed by the print system in accordance with an embodiment.
Figure 6B:
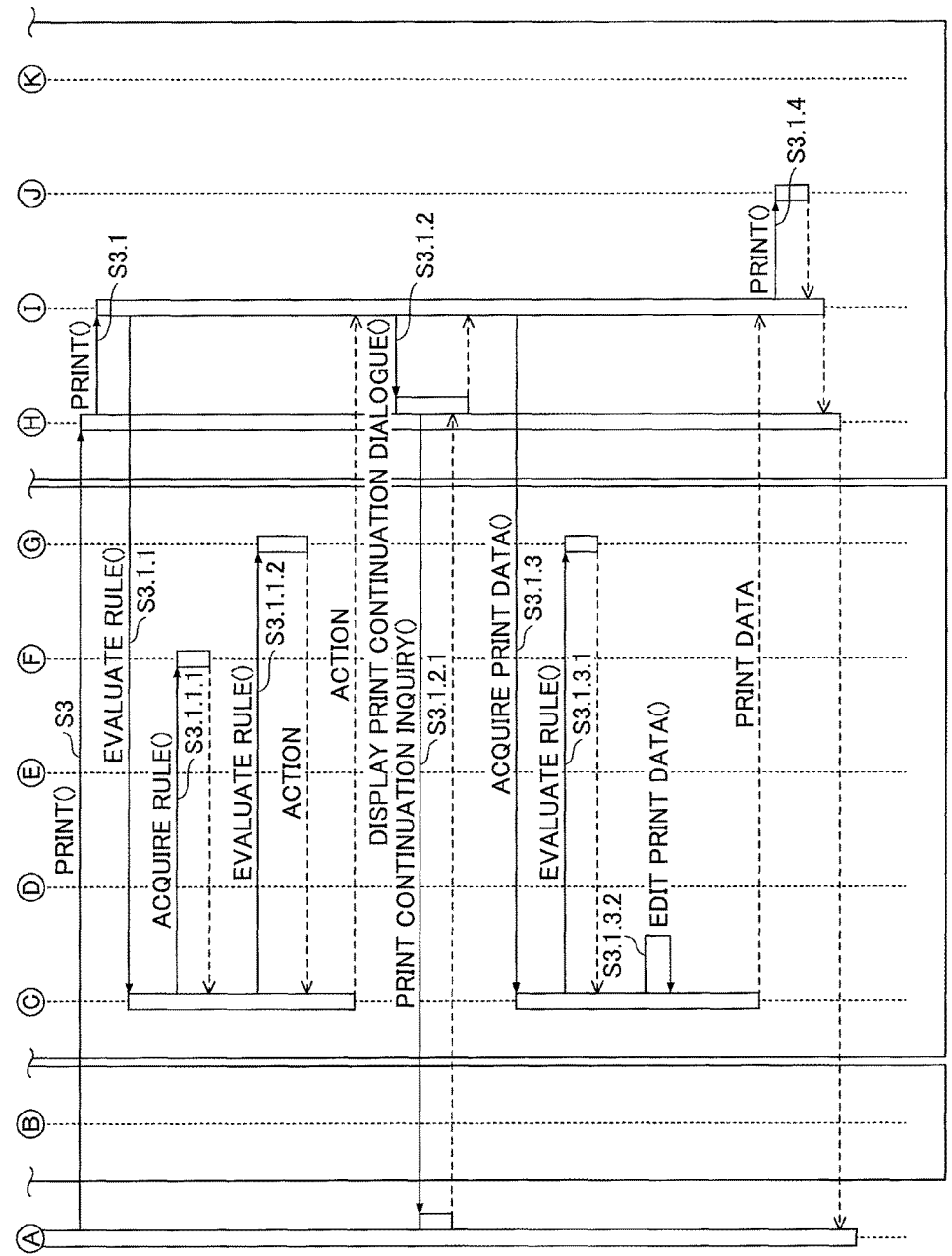

FIGS. 6A and 6B are a sequence diagram illustrating an example of a rule-based printing process performed by the print system 10 in accordance with the first embodiment.

S1: The user U operates the input part 205 of the user PC 11 to transmit the print data.

S1.1: As a result of S1, the communications part 21 of the user PC 11 transmits the print data to the print server 12.

S1.1.1: The communications part 41 of the print server 12 receives the print data, and transmits the received print data to the document information accumulator 45.

S1.1.2: The document information accumulator 45 extracts document information by analyzing the print data and the print settings. The document information is stored in the document information management DB 5003.

S1.1.3: The job controller 46 outputs the print data to the job accumulator 42. The job accumulator 42 accumulates the print data in the print data management DB 5001. The document information is associated with the ID of the print data.

Printing

S2: The user U performs a login operation via the input-output part 32 of the image forming apparatus 13.

S2.1: The input-output part 32 outputs authentication information (e.g., a user name and password combination) input by the user U together with a login request to the authenticator 35.

S2.2: When the login is successful, the input-output part 32 transmits a job list request to the print manager 33 for displaying a job list screen on the operations part 307. Note that the input-output part 32 does not necessarily acquire the job list after the login, the input-output part 32 may acquire the job list after the user U is identified.

S2.2.1: The print manager 33 of the image forming apparatus 13 transmits a job list request to the job controller 46 of the print server 12. The job list request includes the user ID and identifier information ("MFP ID" in FIGS. 6A and 6B) of the image forming apparatus 13.

S2.2.1.1: The job controller 46 transmits a document information request for the document information extracted from the print data and the print settings of the user U to the document information accumulator 45. The list of print jobs may be acquired from the document information.

S2.2.1.2: The job controller 46 transmits a rule data extraction request to the rule manager 43. The rule manager 43 reads the rule data in association with the user ID and identifier information of the image forming apparatus 13 from the rule data management DB 5002. The job controller 46 subsequently determines whether there is an action to be processed by the image forming apparatus 13 among the actions described in the rule data, and transmits (returns) the job list including a determined result (hereinafter called an "action determination result") as a response. The actions to be processed by the image forming apparatus 13 are predetermined, and the "confirmation" action corresponds to one of the actions to be processed by the image forming apparatus 13 in this embodiment. In each of the records of the rule data management table, a flag indicating the action to be processed by the image forming apparatus 13 may be provided as a field.

In response in S2.2.1, the job list including the action determination result is transmitted to the print manager 33 of the image forming apparatus 13. The job list is displayed on the operations part 307 of the image forming apparatus 13. Accordingly, the user U may be able to acknowledge the print jobs that the user U can execute. The following illustrates the job list transmitted to the image forming apparatus 13 with reference to FIG. 7.

S3: The user U selects a desired one of the print jobs from the displayed job list (the displayed list of the print jobs) and transmits an instruction to execute the selected print job.

S3.1: The input-output part 32 transmits a print request together with identifier information of the print job selected by the user U to the print manager 33. The identifier information of the print job may be an ID of the print data; however, the identifier information of the print job may be a serial number that is numbered specific to the print job of the user U. This serial number is associated with the ID of the print data.

S3.1.1: When the action determination result included in the job list indicates that there is an action to be executed by the image forming apparatus 13, the print manager 33 verifies whether there is an action to be processed by the image forming apparatus 13 in association with the print job selected by the user U. This process in S3.1.1 is called "rule evaluation". The print manager 33 transmits the ID of the print data for use in the print job selected by the user U together with a rule evaluation request to the print server 12.

S3.1.1.1: The job controller 46 of the print server 12 transmits a rule data request for the rule data identical to the rule data in S2.2.1.2 to the rule manager 43. Note that in this step, the job controller 46 not only transmits a rule data request for the rule data in association with the ID of the user U and the identifier information of the image forming apparatus 13 but also transmits a rule data request for all the rule data.

S3.1.1.2: The job controller 46 transmits to the rule engine 44 a rule data evaluation request to evaluate a rule with respect to the document information and the information subject to application extracted from the print data of the print job selected by the user U. The job controller 46 acquires an action corresponding to the print job in response to the rule data evaluation request. The job controller 46 transmits the action corresponding to the print job to the print manager 33 of the image forming apparatus 13.

S3.1.2: The print manager 33 of the image forming apparatus 13 displays, if necessary, a print continuation dialog on the operations part 307, based on the acquired action. "Optionally" indicates a case where the actions include the action to be processed by the image forming apparatus 13 to change the print settings of the user U. The following gives supplementary information with reference to a flowchart of FIG. 8.

S3.1.2.1: The input-output part 32 displays a print continuation dialog on the operations part 307 to inquire of the user whether the user U desires to continue or cancel the printing due to the print settings changed according to the rule data. The user U depresses the later-described continuation button or print end button in response to the inquiry. Accordingly, the user U may be able to check (acknowledge) in advance a case where the printing having the print settings not set by the user U is to be executed. Note that the print continuation dialog will be illustrated with reference to FIG. 9.

S3.1.3: When the printing is continued, the print manager 33 transmits a print data request to the job controller 46 of the print server 12.

S3.1.3.1: The job controller 46 transmits a rule evaluation request for the print data to the rule engine 44 again. The result of S3.1.1.2 may be reused as the rule evaluation. However, when the rule evaluation is performed again (reevaluation of the rule) without reusing the result of S3.1.1.2, maintenance of a session between the image forming apparatus 13 and the print server 12 is no longer required. When the session between the image forming apparatus 13 and the print server 12 is maintained, the result of S3.1.1.2 is reused. S3.1.3.2: The print setting editor 461 of the job controller 46 edits the print settings of the print data in accordance with the action extracted from the rule data. For example, when the action "forceMono" is extracted, the print setting editor 461 edits the color setting of the print settings to "monochrome" despite "color" being set in the color setting of the print settings. The job controller 46 transmits the print data and the edited print settings to the image forming apparatus 13 in response in S3.1.3.

S3.1.4: The print manager 33 of the image forming apparatus 13 outputs the print data to the print part 34 to transmit a print request.

As described above, the image forming apparatus 13 acquires the action determination result in advance when acquiring the job list in S2.2.1. The image forming apparatus 13 detects the actions corresponding to the print jobs selected by the user U that are necessary to be processed by the image forming apparatus 13 with reference to the action determination result, and transmits a rule evaluation request to the print server 12 for evaluating the rule with respect to the print job selected in S3.1.1. The image forming apparatus 13 displays the print continuation dialog based on the evaluation result.

Accordingly, when it is clear that there is no job to be processed by the image forming apparatus 13, inquiry in S3.3.1 may be omitted. Thus, printing is performed without performing unnecessary communications.

Job List

FIG. 7 is a diagram illustrating an example of a list of jobs (job list) acquired by the image forming apparatus 13 in response in S2.2.1. In FIG. 7, document information of two print jobs are described in an XML format. The description 4 is document information of the print job created from the print data having the "ID=1", and the description 5 is document information of the print job created from the print data having the "ID=2".

<id> tag indicates an ID of the print data.
<color> tag indicates the color setting of the print settings.
<copies> tag indicates the number of sets in the print settings.
<duplex> tag indicates both sides or a single side of the print settings.
<name> tag indicates a job name.
<nup> tag indicates the aggregate setting of the print settings.
<pageCount> tag indicates the number of pages at printing.
<paperSize> tag indicates the sheet size of the print settings.
<size> tag indicates the magnification setting of the print settings.

<ruleCheckRequired> described in the description 6 indicates the above-described action determination result. The action determination result acquires a "True/False" value. True is set when there is an action to be processed by the image forming apparatus 13, and False is set when there is no action to be processed by the image forming apparatus 13.

Determining Whether to Display Print Continuation Dialog

FIG. 8 is a flowchart illustrating an example of a process of determining whether the image forming apparatus 13 displays the print continuation dialogue on the operations part 307 in S3.1.2.

The print manager 33 that has received the action determines whether the action includes the action to be processed by the image forming apparatus 13 (step S10). That is, the print manager 33 determines whether the action includes "confirmation". When the determination in step S10 is NO, the print manager 33 ends the process of FIG. 8 because there is no need of displaying the print continuation dialog.

When the determination in step S10 is YES, the print manager 33 determines whether action matches the print settings of the print job acquired as the job list (step S20). For example, when the action "forceMono" is received, and "color" is set in the color setting (<color> tag) of the print settings, the action does not match the print settings of the print job.

When the determination in step S20 is YES, the print manager 33 determines to display the print continuation dialog (step S30).

Accordingly, when the action includes the action to be processed by the image forming apparatus 13 and the print settings of the user U are changed, the image forming apparatus 13 may inquire of the user U whether to continue printing.

Note that when the action includes the action to be processed by the image forming apparatus 13, the image forming apparatus 13 may display the print continuation dialog regardless of whether to change the print settings of the user U. The user U may check the print result in a similar manner as above.

The example illustrates the determination process of FIG. 8 being performed by the print manager 33; however, the determination process of FIG. 8 may be performed by the print server 12. In this case, the print server 12 transmits a report indicating whether to display the print continuation dialog to the image forming apparatus 13.

Print Continuation Dialog

Figure 9:
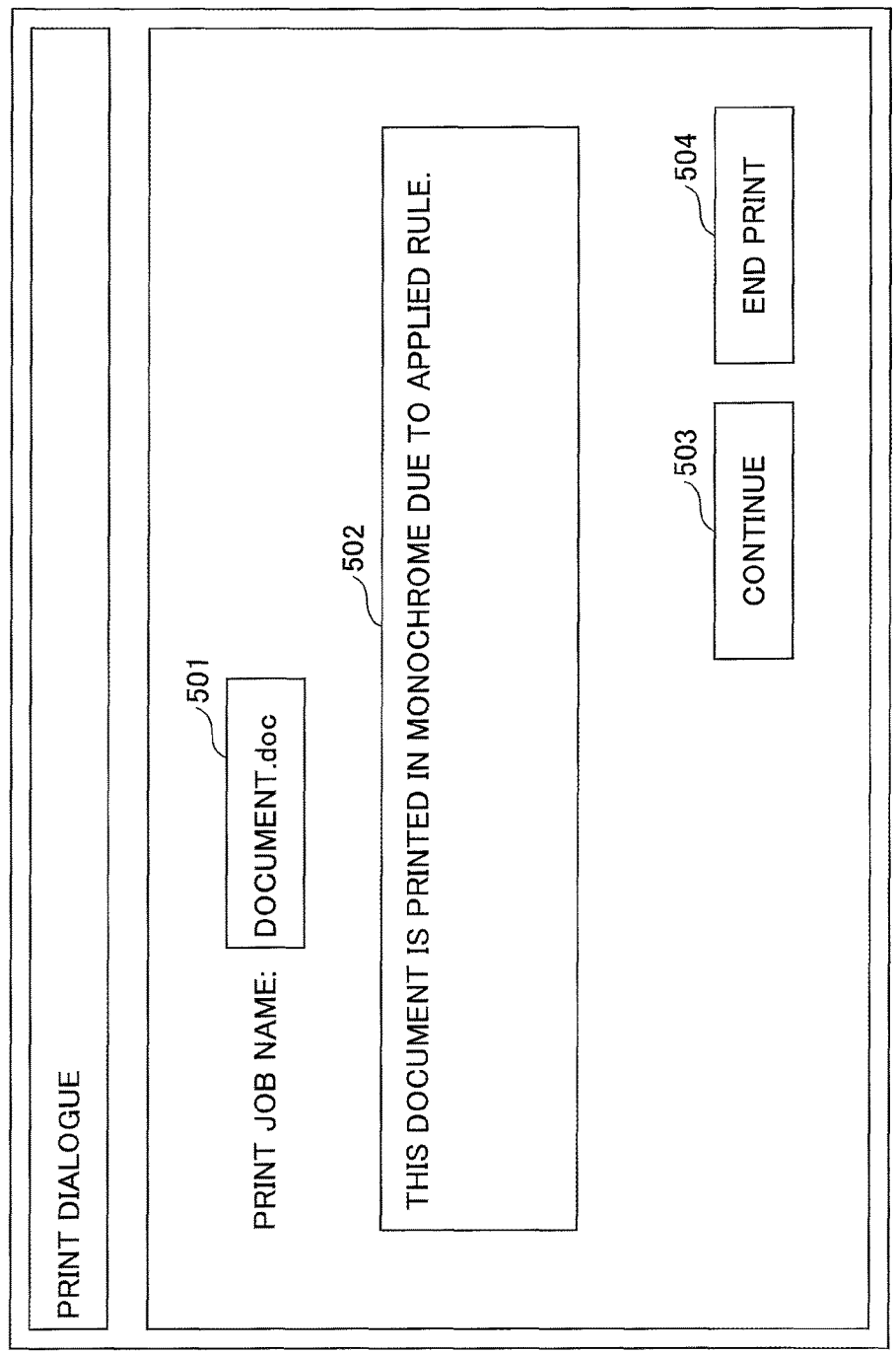
FIG. 9 is a diagram illustrating an example of the print continuation dialogue in accordance with an embodiment.

FIG. 9 is a diagram illustrating an example of the print continuation dialog. The print continuation dialog includes a print job name 501, a message field 502, a continuation button 503, and a print end button 504. The print job name 501 is a print job selected by the user U in step S3. The message field 502 displays a message "this printing is executed in black and white due to application or rule". Accordingly, the user U may be able to check the print settings are changed due to the rule-based printing. The user U depresses the continuation button 503 to continue the printing or the print end button 504 to cancel the printing.

The print continuation dialog may be a popup message displayed on the job list or may be displayed on a different screen moved from the screen displaying the job list.

The print system 10 according to the embodiment may inform the user U in advance that the user fail to acquire the print result intended in the rule-based printing. The print system 10 according to the embodiment may omit unnecessary communications.

Second Embodiment

The following illustrates a print system 10 according to a second embodiment. In the print system 10 according to the second embodiment, the print server 12 generates an action determination result for each of the print jobs. Since the print server 12 generates an action determination result for each of the print jobs, the image forming apparatus 13 requests the print server 12 to evaluate the rule only when the user U selects the print job in association with the action to be processed by the image forming apparatus 13. Accordingly, the number of unnecessary communications may be reduced in the second embodiment compared to the number of communications reduced in the first embodiment, and time required to complete printing may also be reduced.

Note that a functional block diagram of the print system 10 according to the second embodiment may be similar to the functional block diagram of the print system 10 according to the first embodiment illustrated in FIG. 5. In the following, components provided with the same reference numerals serve as the same functions of the above-described components; duplicated illustration of the same components is omitted and only the difference will be described.

Operation Process

Figure 10A:
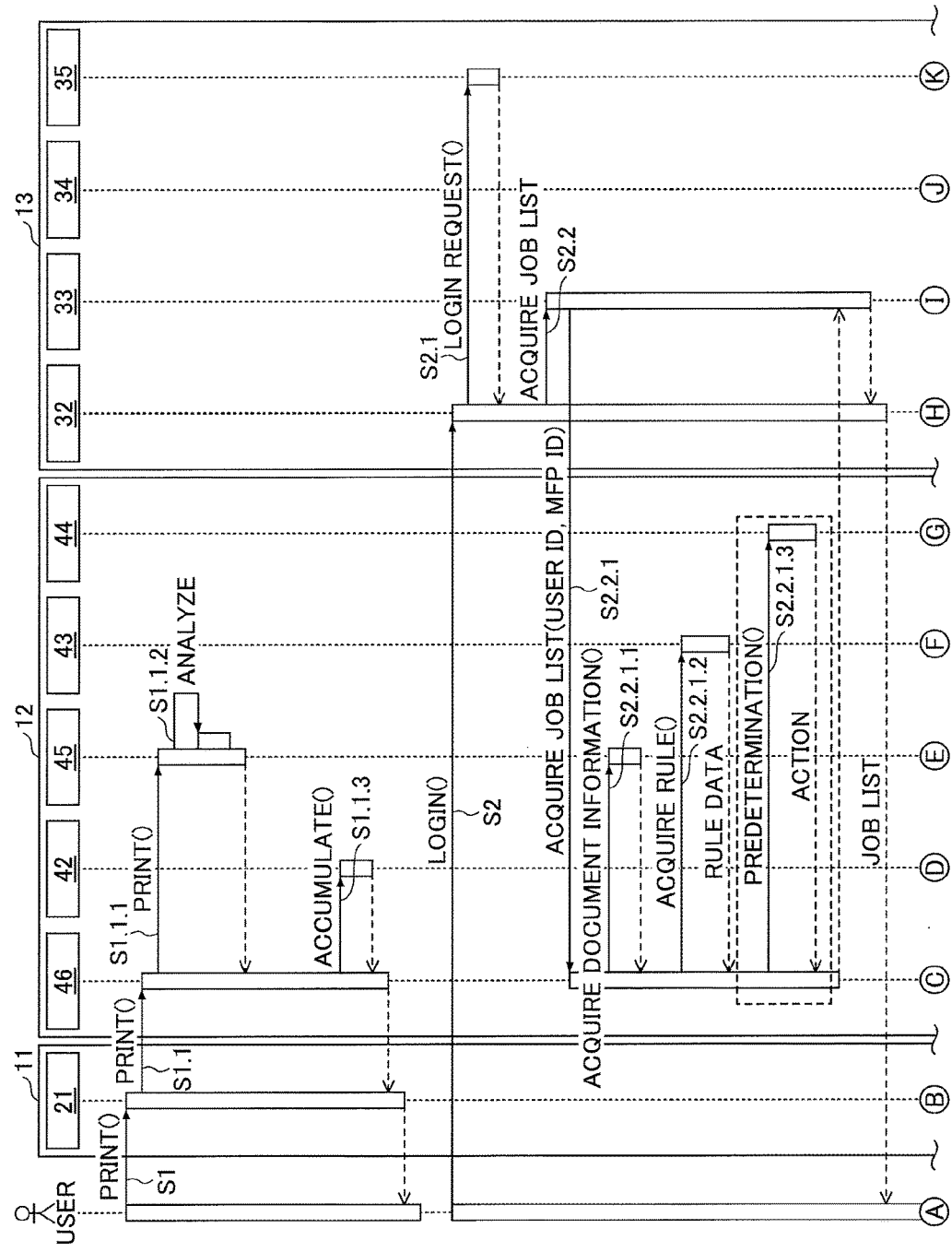
FIGS. 10A and 10B are a sequence diagram illustrating another example of a rule-based printing process performed by the print system in accordance with an embodiment (second embodiment)
Figure 10B:
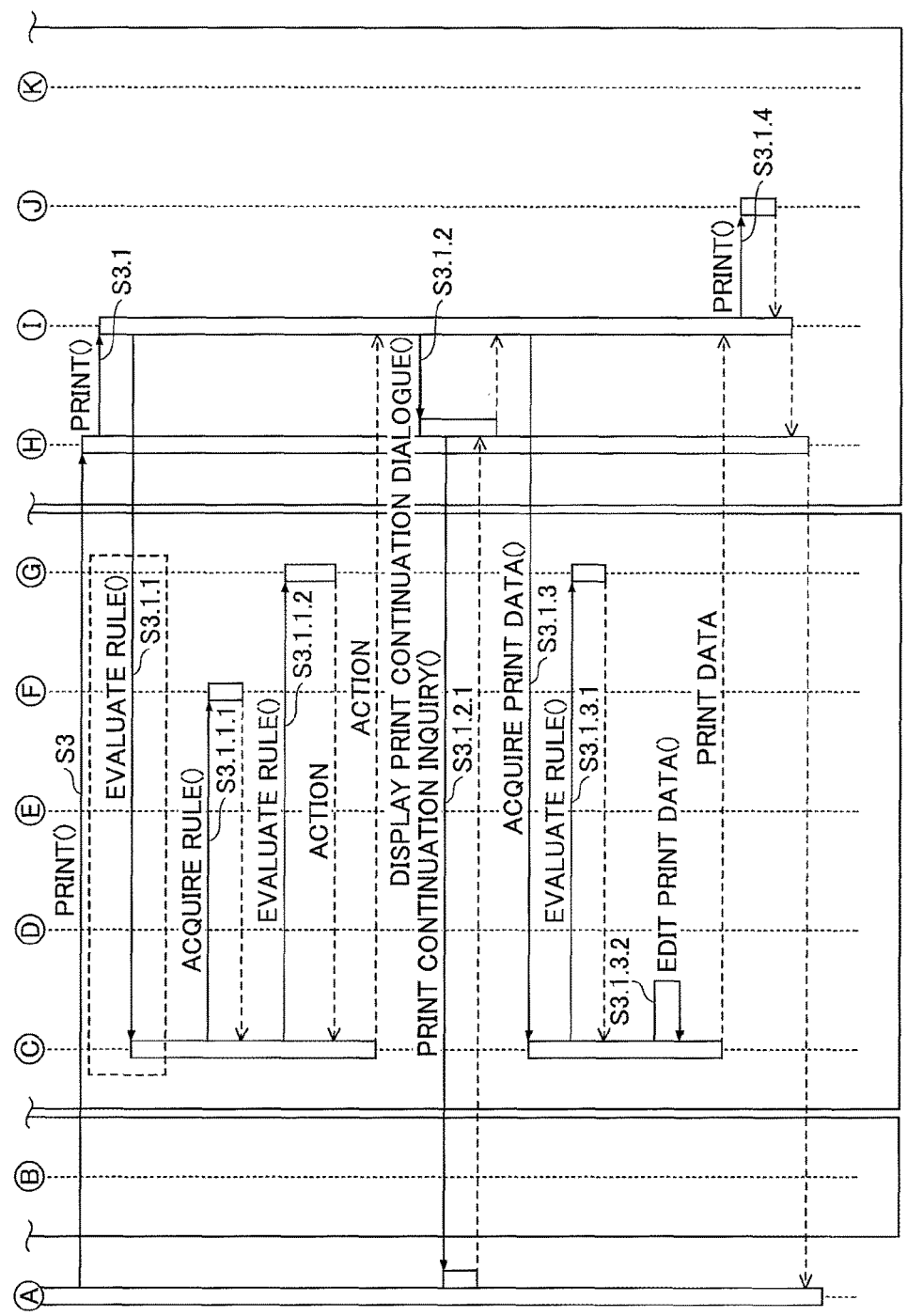

FIGS. 10A and 10B are a sequence diagram illustrating an example of a rule-based printing process performed by the print system 10 in accordance with the second embodiment. The following focuses mainly on the difference between the process of FIGS. 10A and 10B and the process of FIGS. 6A and 6B to avoid duplicating description. Steps S1 to S2.2.1.2 in FIGS. 10A and 10B are similar to steps S1 to S2.2.1.2 in FIGS. 6A and 6B.

S2.2.1.3: The job controller 46 of the print server 12 has already acquired the rule data in association with the user ID and the identifier information of the image forming apparatus 13. Thus, the job controller 46 transmits to the rule engine 44 a preliminary determination request for performing preliminary determination on each of the print jobs based on the rule data. The rule engine 44 determines whether the document information and the information subject to application match the rule data for each of the print jobs, and when the document information and the information subject to application match the rule data, the rule engine 44 extracts actions from the document information and the information subject to application corresponding to the job. The action that includes "confirmation" corresponds to the action that needs to be processed by the image forming apparatus 13. Hence, the job controller 46 may be able to acquire an action determination result indicating whether there is any process that needs to be processed by the image forming apparatus 13 for each of the print jobs.

Figure 11:
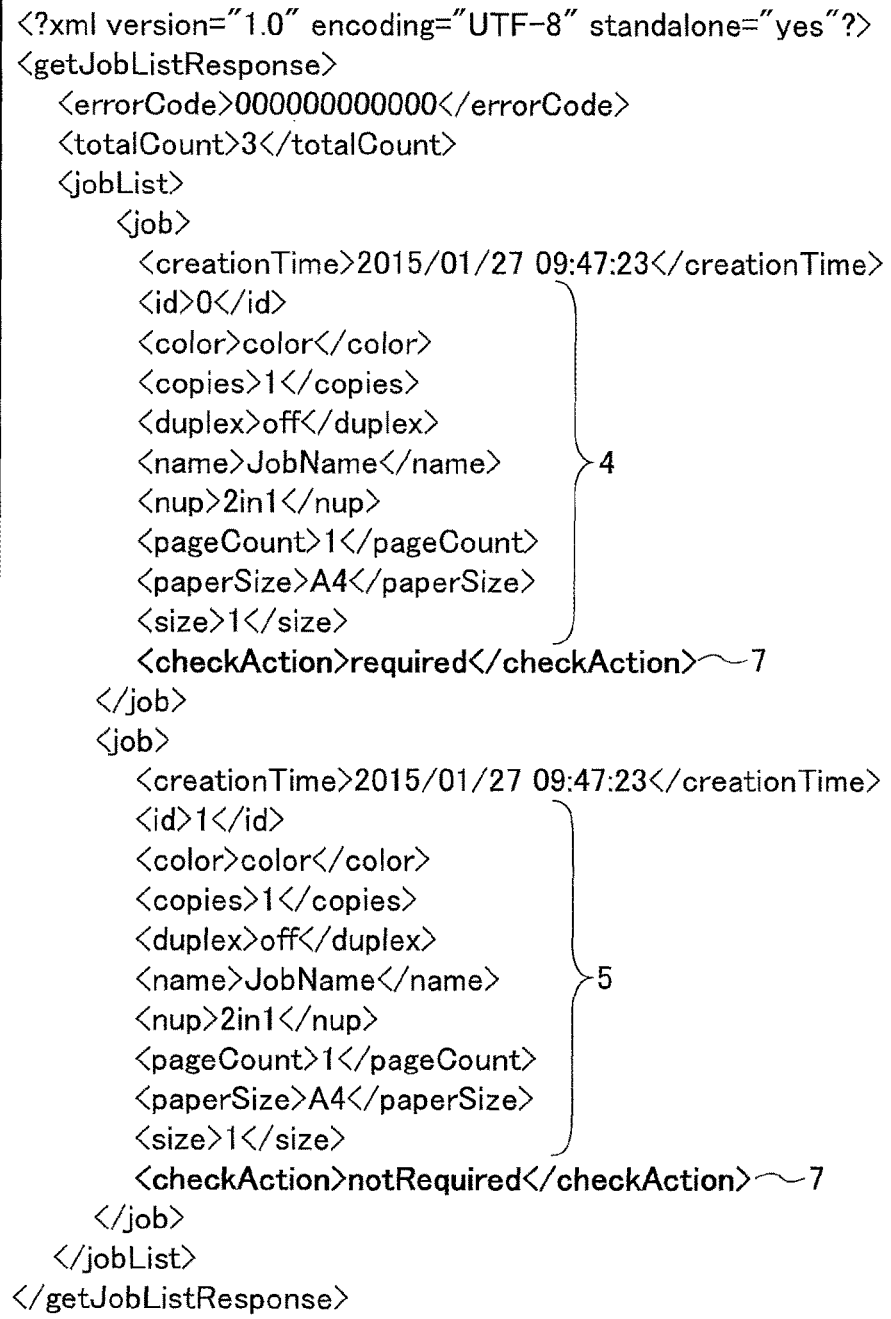
FIG. 11 is a diagram illustrating an example of a list of jobs acquired by an image forming apparatus in accordance with an embodiment (a second embodiment)

The job list transmitted to the image forming apparatus 13 includes an action determination result for each of the print jobs. FIG. 11 illustrates an example of the job list according to the second embodiment.

S3.1.1: The print manager 33 transmits a rule evaluation request to the print server 12 for evaluating whether there is any action to be processed by the image forming apparatus 13 only when the action determination result for the print job selected by the user U is True. When the action determination result for the print job selected by the user U is False, there is no need of transmitting a rule evaluation request to the print server 12. Thus, the number of communications in the second embodiment may be reduced in the second embodiment compared to the number of communications in the first embodiment. The steps subsequent to S3.1.1 are similar in FIGS. 6A and 6B.

Job List

FIG. 11 is a diagram illustrating an example of a list of jobs (job list) acquired by the image forming apparatus 13 in response in S2.2.1. In FIG. 11, components provided with the same reference numbers as the print system 1 according to the first embodiment illustrated in FIG. 7 implement the same functional components. Hence, only main components of the second embodiment are described below.

In FIG. 11, the action determination result of the second embodiment is described in the <checkAction> tag illustrated in the description 7. The action determination result of the second embodiment acquires a "required/notRequired" value. The "required" is set when there is an action to be processed by the image forming apparatus 13, and the "notRequired" is set when there is no action to be processed by the image forming apparatus 13.

As illustrated above, in the print system 10 according to the second embodiment, only when the user U selects the print job having the action to be processed by the image forming apparatus 13, does the image forming apparatus 13 transmit a rule evaluation request to the print server 12. Thus, the number of communications in the second embodiment may be reduced compared to the number of communications in the first embodiment. In the first embodiment, the image forming apparatus 13 needs to transmit a rule evaluation request to the print server 12 even when the action to be processed by the image forming apparatus 13 is not generated from the print job selected by the user U.

Third Embodiment

In the print system 10 according to a third embodiment, an action determination result indicating whether rule evaluation is necessary for each of the print jobs is attached when the job list is acquired. In the second embodiment, an action determination result (indicating whether rule evaluation is necessary) is attached for each of the jobs in the job list. However, in the third embodiment, the action determination result indicating whether rule evaluation is necessary for each of the jobs is directly attached to the job list. Thus, the print system 10 according to the third embodiment does not require the second rule evaluation (S3.1.1 in FIGS. 6 and 10).

Operation Process

Figure 12A:
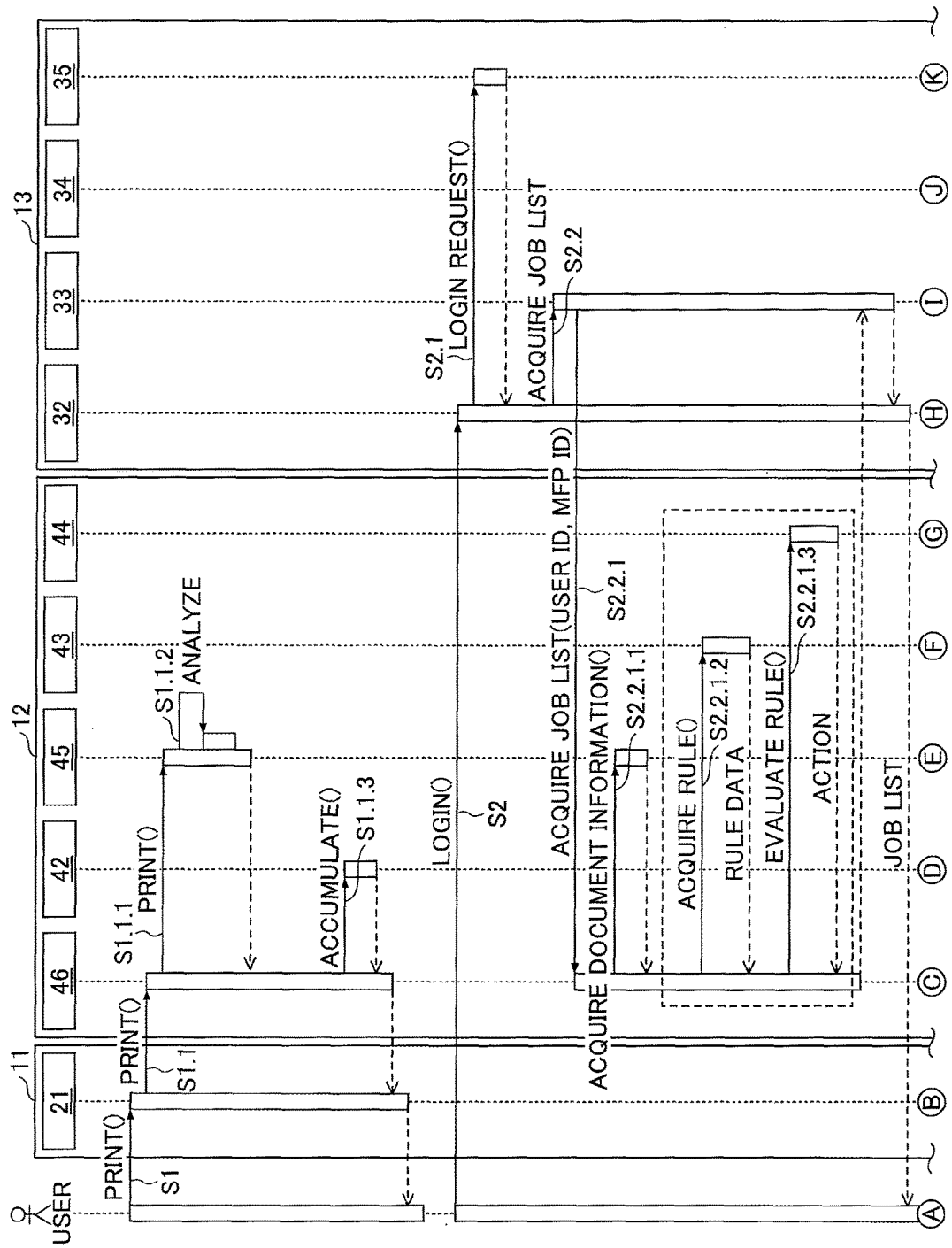
FIGS. 12A and 12B are a sequence diagram illustrating still an example of a rule-based printing process performed by a print system in accordance with an embodiment (a third embodiment)
Figure 12B:
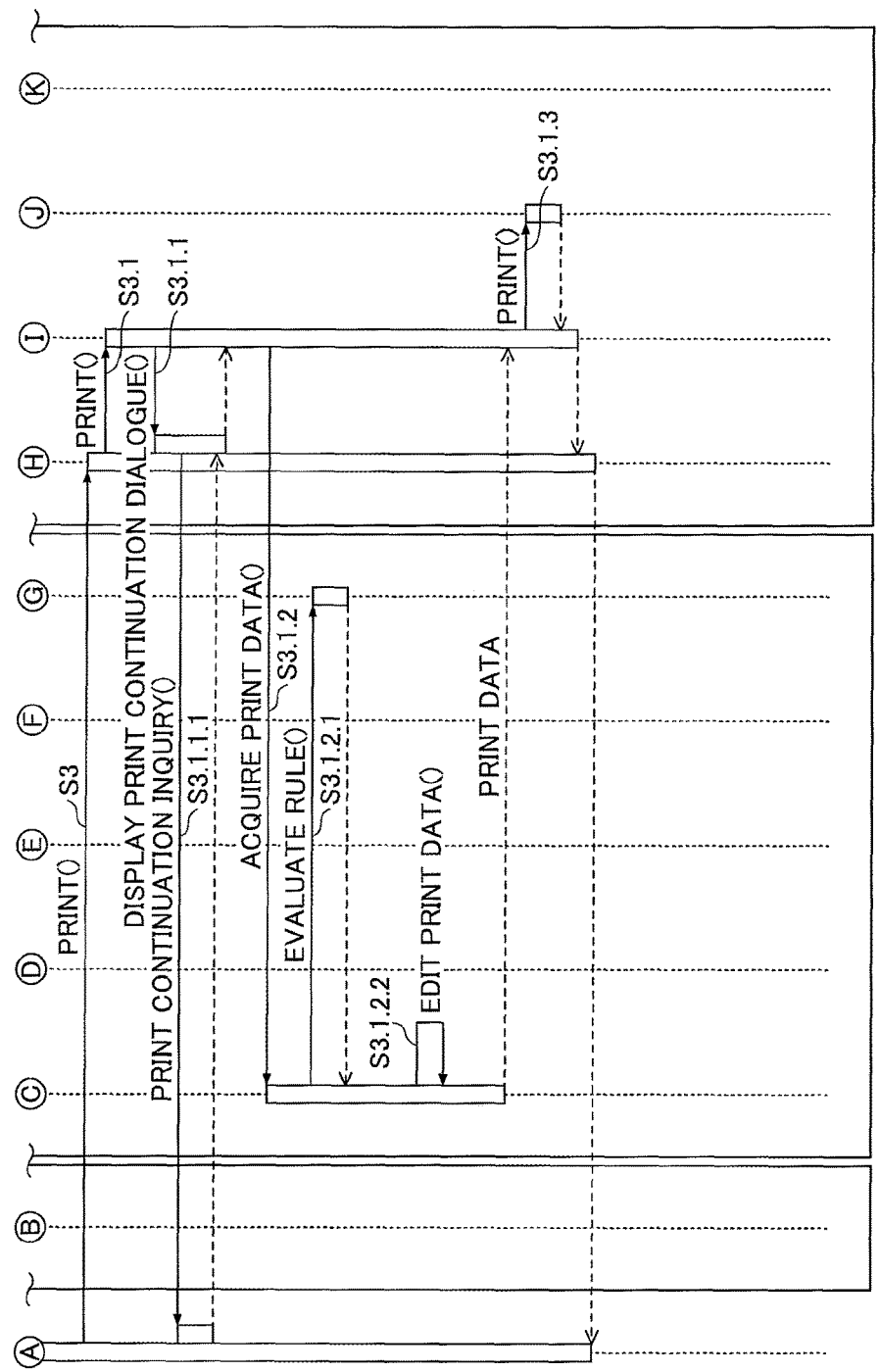

FIGS. 12A and 12B are a sequence diagram illustrating an example of a rule-based printing process performed by the print system 10 in accordance with the third embodiment. The following focuses mainly on the difference between the process of FIGS. 12A and 12B and the process of FIGS. 10A and 10B to avoid duplicating description. In FIGS. 12A and 12B, the difference from the process of FIGS. 10A and 10B is S2.2.1.3. Further, the process in FIGS. 12A and 12B has no step corresponding to S3.1.1.

S2.2.1.3: The job controller 46 of the print server 12 has already acquired the rule data in association with the user ID and the identifier information of the image forming apparatus 13. Thus, the job controller 46 transmits to the rule engine 44 an evaluation request for performing evaluation on each of the print jobs based on the rule data. The rule engine 44 determines whether the document information and the information subject to application match the rule data for each of the print jobs, and when the document information and the information subject to application match the rule data, the rule engine 44 extracts actions from the document information and the information subject to application corresponding to the job. When there is any action that needs to be processed by the image forming apparatus 13, the job controller 46 attaches such an action to the job list. Note that all the actions may be attached to the job list.

Accordingly, the job list transmitted to the image forming apparatus 13 includes the action that needs to be processed by the image forming apparatus 13 (i.e., the action having "confirmation") for each of the jobs. FIG. 13 illustrates an example of the job list according to the third embodiment. These actions correspond to an example of third data.

S3.1.1: The print manager 33 of the image forming apparatus 13 determines whether to display print continuation dialog without transmitting an inquiry again. The determining method is similar to the determining method in first embodiment; that is, whether the print job selected by the user U has any action that needs to be processed by the image forming apparatus 13, and whether the print settings are changed.

The third embodiment does not require the second rule evaluation, which may reduce the number of communications compared to the number of communications in the first embodiment and the number of communications in the second embodiment. Accordingly, the print continuation dialog may be displayed with the number of communications the same as the number of communications required for not displaying the print continuation dialog.

Job List

FIG. 13 is a diagram illustrating an example of a list of jobs (job list) acquired by the image forming apparatus 13 in response in S2.2.1. In FIG. 13, components provided with the same reference numbers as the print system 1 according to the second embodiment illustrated in FIG. 11 implement the same functional components. Hence, only main components of the third embodiment are described below.

In FIG. 13, the action that needs to be processed by the image forming apparatus 13 is described in the <actions> tag illustrated in the description 8. When there is any action that needs to be processed by the image forming apparatus 13, "notification" is described in the <action> tag. When there is no action that needs to be processed by the image forming apparatus 13, nothing is described. In the example of FIG. 13, the print job illustrated in the description 4 has an action that needs to be processed by the image forming apparatus 13 and the print job illustrated in the description 5 has no action that needs to be processed by the image forming apparatus 13.

In the print system 10 according to the third embodiment, the job list includes the action that needs to be processed by the image forming apparatus 13. Hence, the number of communications between the image forming apparatus 13 and the print server 12 may be reduced compared to the number of communications in the first embodiment and the second embodiment.

Fourth Embodiment

In the print system 10 according to the third embodiment, the image forming apparatus 13 does not require the second rule evaluation; however, there is some information mainly included in information subject to application may change as to whether to match the rule in accordance with time. The print system 10 according to a fourth embodiment conducts second rule evaluation corresponding to a print job that may change the action obtained based on the rule evaluation.

Initially, the information subject to application may change in accordance with time. There is some information subject to application that includes current time (time at pull printing), a day of the week, and date. When the information subject to application includes the printable number of pages, the printable number of pages may be changed by the user U's executing printing. Note that the printable number of pages indicates the number of pages allocated to the user U per month to print out.

The following illustrates the rule in association with such information subject to application. Such information subject to application may include the rule having time. In the following description, it is assumed that an action to print watermark stating "printing outside duty hours" is associated with the rule indicating an interval between 22:00 to 07:00 on the following day. This case assumes that printing conducted outside duty hours is recorded for security reasons. When the image forming apparatus 13 has acquired a job list immediately before 22:00, the information subject to application does not match the rule. Hence, the job list does not include the action that needs to be processed by the image forming apparatus 13. However, when the time exceeds 22:00 at printing, and the rule evaluation is conducted again, the information subject to application matches the rule after. Thus, the user U is not able to acquire a desired print result. Accordingly, it is preferable to conduct the second rule evaluation immediately before printing.

Further, the information subject to application may include the rule having the printable number of pages. It is assumed that the action "aggregate" is associated with the rule "the printable number of pages per month exceeds 300 pages". The printable number of pages per month does not exceed 300 pages when the image forming apparatus 13 has acquired a job list. Hence, the action that needs to be processed by the image forming apparatus 13 is not included in the job list. However, a large number of copies or a large amount of push printing may be conducted in parallel with the rule-based printing. In such a case, when the printed number of pages exceeds 300 pages when the rule evaluation is conducted, the user U fails to obtain the print result intended by the user U. Accordingly, it is preferable to conduct the second rule evaluation immediately before printing.

Operation Process

Figure 14A:
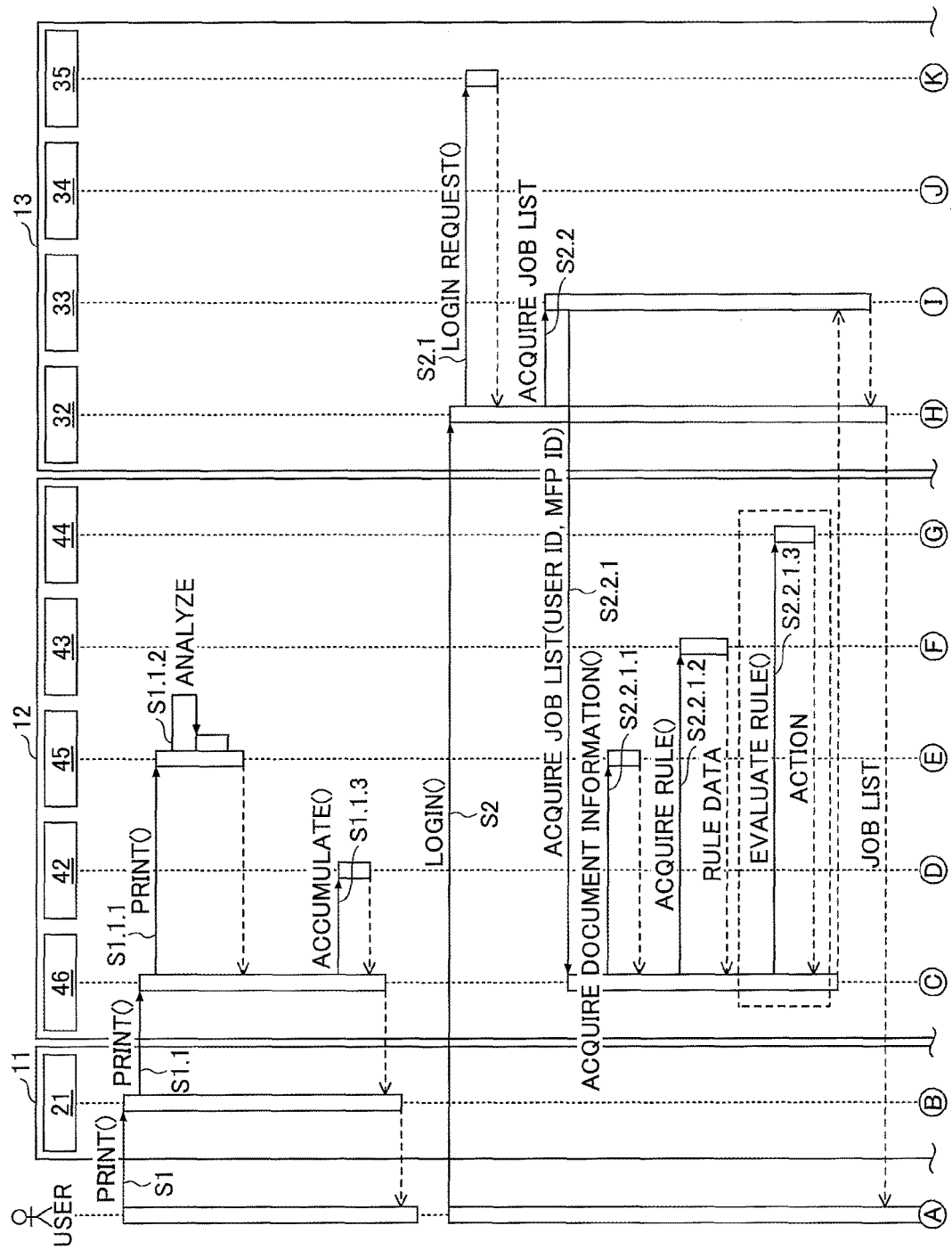
FIGS. 14A and 14B are a sequence diagram illustrating yet another example of a rule-based printing process performed by a print system in accordance with an embodiment (a fourth embodiment)
Figure 14B:
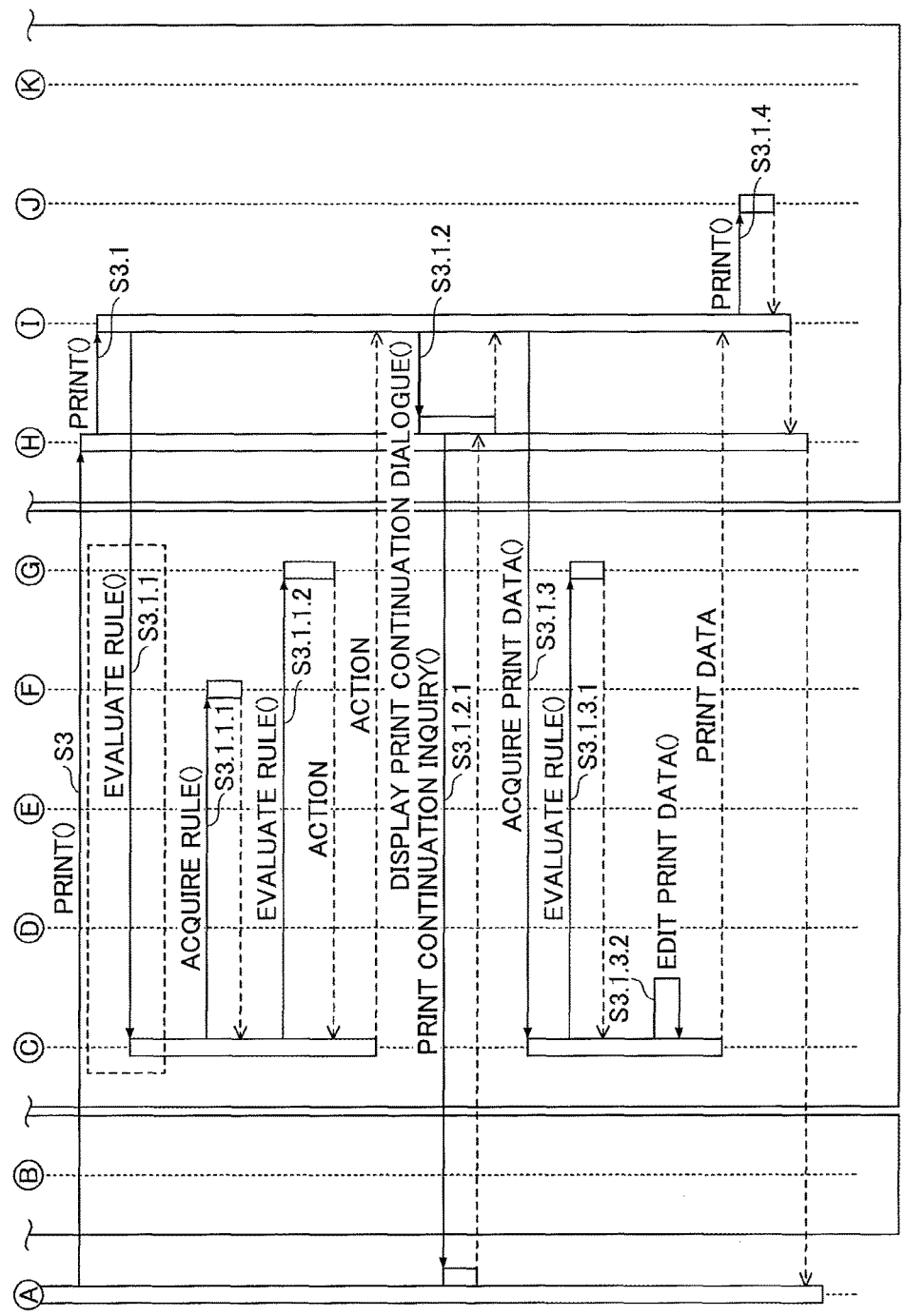

FIGS. 14A and 14B are a sequence diagram illustrating an example of a rule-based printing process performed by the print system 10 in accordance with the fourth embodiment. The following focuses mainly on the difference between the process of FIGS. 14A and 14B and the process of FIGS. 12A and 12B to avoid duplicating description. In FIGS. 14A and 14B, the difference from the process of FIGS. 12A and 12B is S2.2.1.3. Further, in S3.1.1, the second rule evaluation is conducted.

S2.2.1.3: When there is any action that needs to be processed by the image forming apparatus 13, the job controller 46 of the print server 12 attaches the action that needs to be processed by the image forming apparatus 13 (attaching the action itself in a manner similar to the third embodiment) to the job list. The job controller 46 determines whether there is any print job having a determination result that may change at the timing of the second rule evaluation. When there is a print job having a determination result that may change at the timing of the second rule evaluation, the job controller 46 attaches reevaluation information requiring the second rule evaluation to the job list. The job list in this case will be illustrated later with reference to FIG. 15.

The supplementary explanation is given below of the print job having the determination result that may change at the timing of the second rule evaluation. The document information is fixed, and the determination result of the document information is less likely to change at the timing of the second rule evaluation. However, the rule data includes plural rules, and when one of the rules includes time or the printable number of pages, the determination result may change at the timing of the second rule evaluation (at the timing of reevaluation). For example, it is assumed that the rule data includes the following two rules (a) and (b): (a) the number of pages is greater than or equal to 10 pages; and (b) the printable number of pages does not exceed a threshold. The print job of five pages does not satisfy the above-described rule data. Thus, this print job will not change at the timing of the second rule evaluation. By contrast, the print job of 15 pages, the determination result of the rule evaluation may change in accordance with the determination of (b). Accordingly, whether the determination result changes at the ting of the second rule evaluation may be determined for each of the print jobs.

S3.1.1: When the user U selects a print job in step S3, the print manager 33 determines whether reevaluation information is attached to the print job selected by the user U. When the reevaluation information is attached to the print job selected by the user U, the print manager 33 transmits a rule evaluation request to the print server 12. In response to the rule evaluation request, the action to be processed by the image forming apparatus 13 or all the actions in a manner similar to the first embodiment to the third embodiment.

Hence, the print manager 33 may transmit inquiry only when the reevaluation information is attached to the print job selected by the user U. Accordingly, the print manager 33 may determine whether to transmit the inquiry to the user U when the determination result is likely to change at the timing of the second rule evaluation while reducing the number of communications.

Job List

Figure 15:
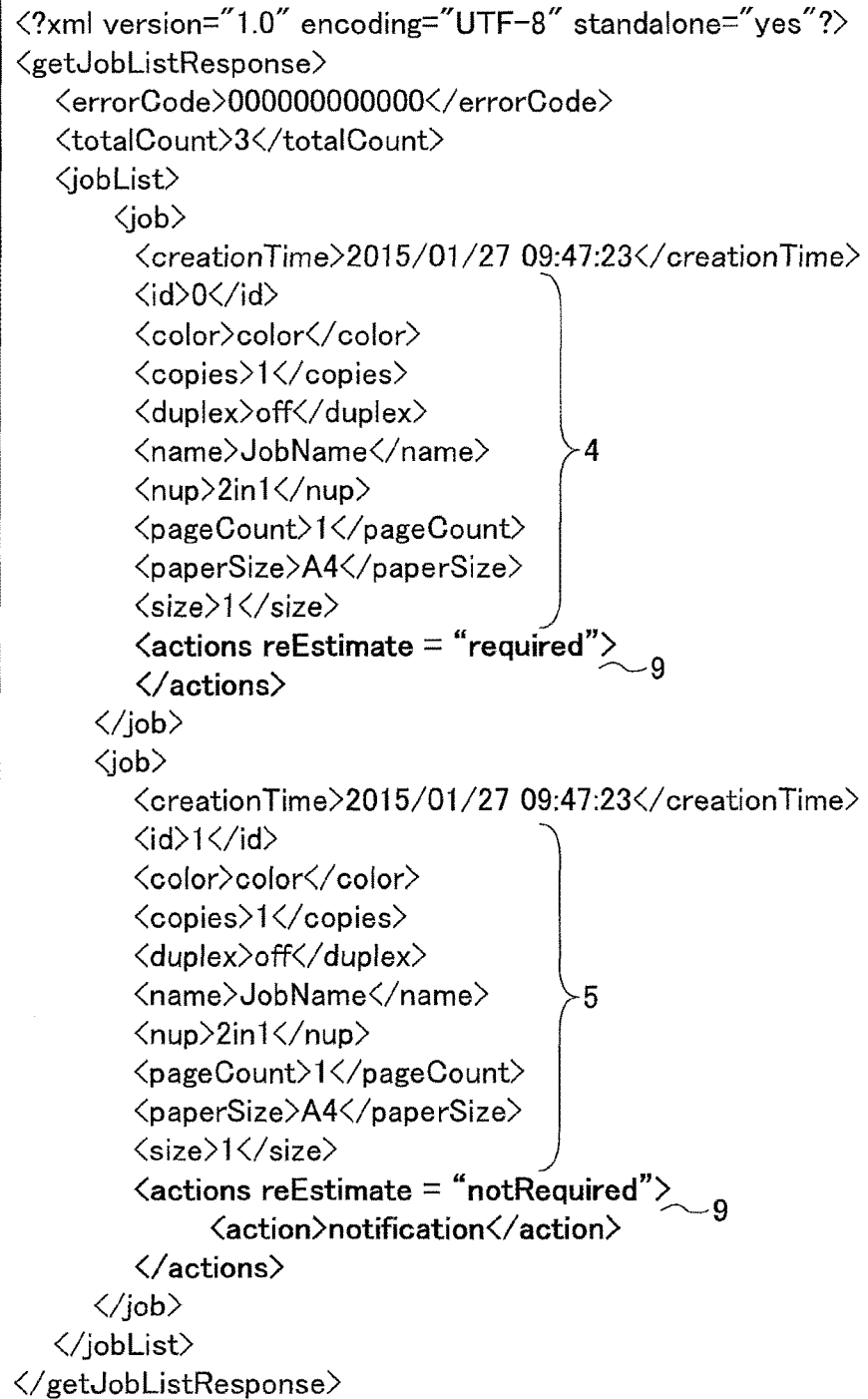
FIG. 15 is a diagram illustrating another example of a list of jobs acquired by the image forming apparatus in accordance with an embodiment (the fourth embodiment)

FIG. 15 is a diagram illustrating an example of a list of jobs (job list) acquired by the image forming apparatus 13 in response in S2.2.1. In FIG. 15, components provided with the same reference numbers as the print system 1 according to the third embodiment illustrated in FIG. 13 implement the same functional components. Hence, only main components of the fourth embodiment are described below.

In FIG. 15, whether the print job needs to be reevaluated by the image forming apparatus 13 is described in a "reEstinate" attribute of the <actions> tag illustrated in the description 9. The "reEstinate" attribute corresponds to the reevaluation information. The print job that needs to be reevaluated by the image forming apparatus 13 includes a "required" value of the "reEstimage" attribute. The print job that does not need to be reevaluated by the image forming apparatus 13 includes a "notRequired" value of the "reEstimage" attribute.

In the example of FIG. 15, the print job described in the description 4 needs to be reevaluated by the image forming apparatus 13, and the print job described in the description 5 does not need to be reevaluated by the image forming apparatus 13.

In the print system 10 according to the fourth embodiment, even when the action at acquiring the job list differs from the action at printing, the second rule evaluation is conducted only on the print job that is likely to change. Hence, the inquiry is transmitted to the user U only when the print job is changed while reducing the number of communications.

Fifth Embodiment

In a print system 10 according to a fifth embodiment, the reevaluation information of the fourth embodiment is further specified. That is, the expiration time (i.e., expiration date and time) is attached to the print job having the determination result that is likely to change at timing of the second rule evaluation. The print manager 33 of the image forming apparatus 13 checks expiration date at printing. When the date is within the expiration time, the second rule evaluation is not necessary. When the date is not within the expiration time, the rule evaluation is conducted again.

For example, it is assumed that an action to print watermark stating "printing outside duty hours" is associated with the rule indicating an interval between 22:00 to 07:00 on the following day. When the image forming apparatus 13 has acquired a job list between 6:00 and 22:00, the job list does not include the action that needs to be processed by the image forming apparatus 13. However, when the image forming apparatus 13 performs printing after 22:00, the user U fails to obtain the print result intended by the user U. On the other hand, when printing is executed before 22:00, the second rule evaluation is not necessary. In such a case, "22:00" is attached to the job list as expiration time in the fifth embodiment.

When printing time is before 22:00, the image forming apparatus 13 determines that the second rule evaluation is not necessary, and when printing time is after 22:00, the image forming apparatus 13 determines that the second rule evaluation is necessary.

Operation Process

Figure 16A:
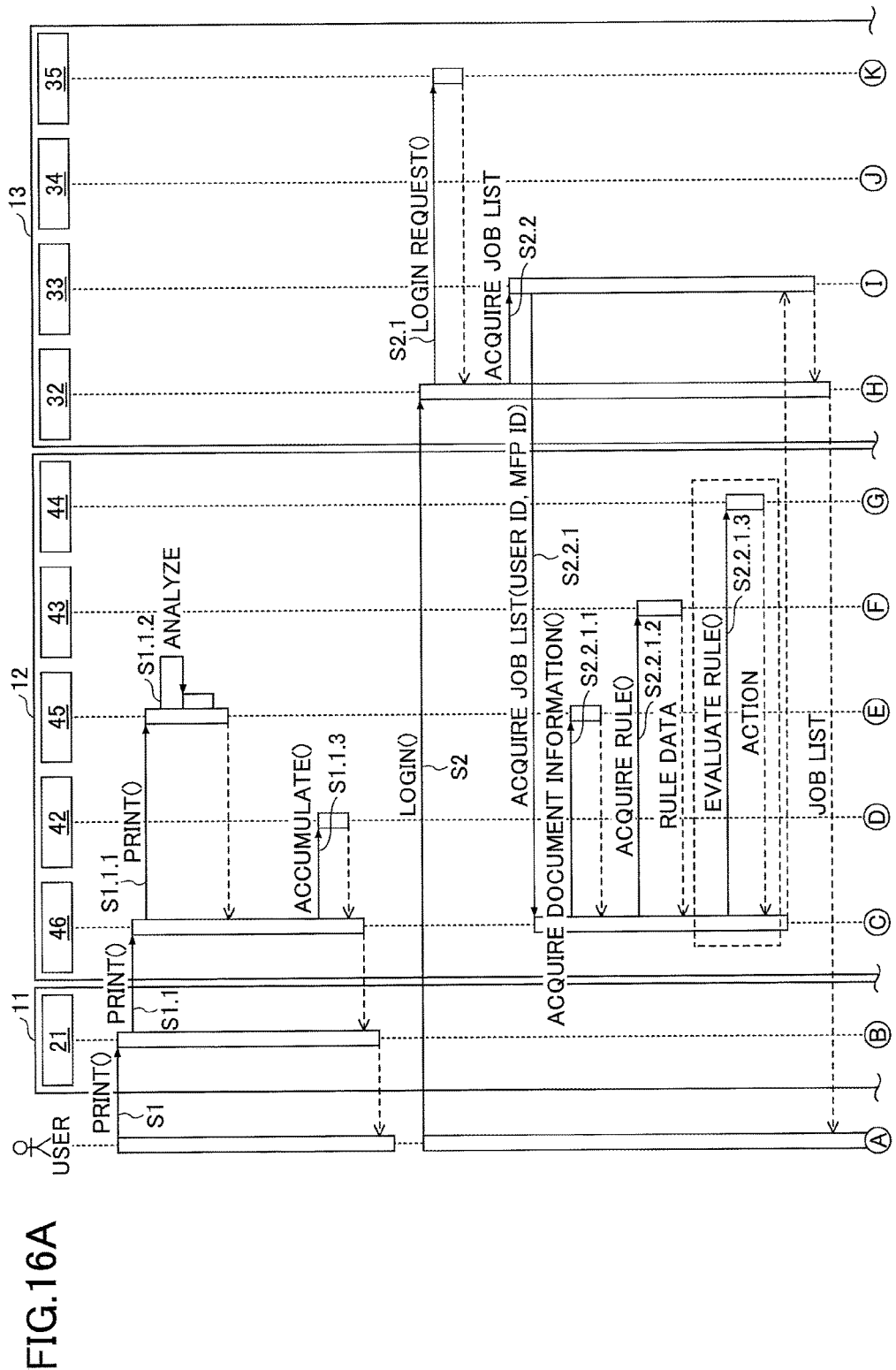
FIGS. 16A and 16B are a sequence diagram illustrating an example of a rule-based printing process performed by a print system in accordance with an embodiment (a fifth embodiment)
Figure 16B:
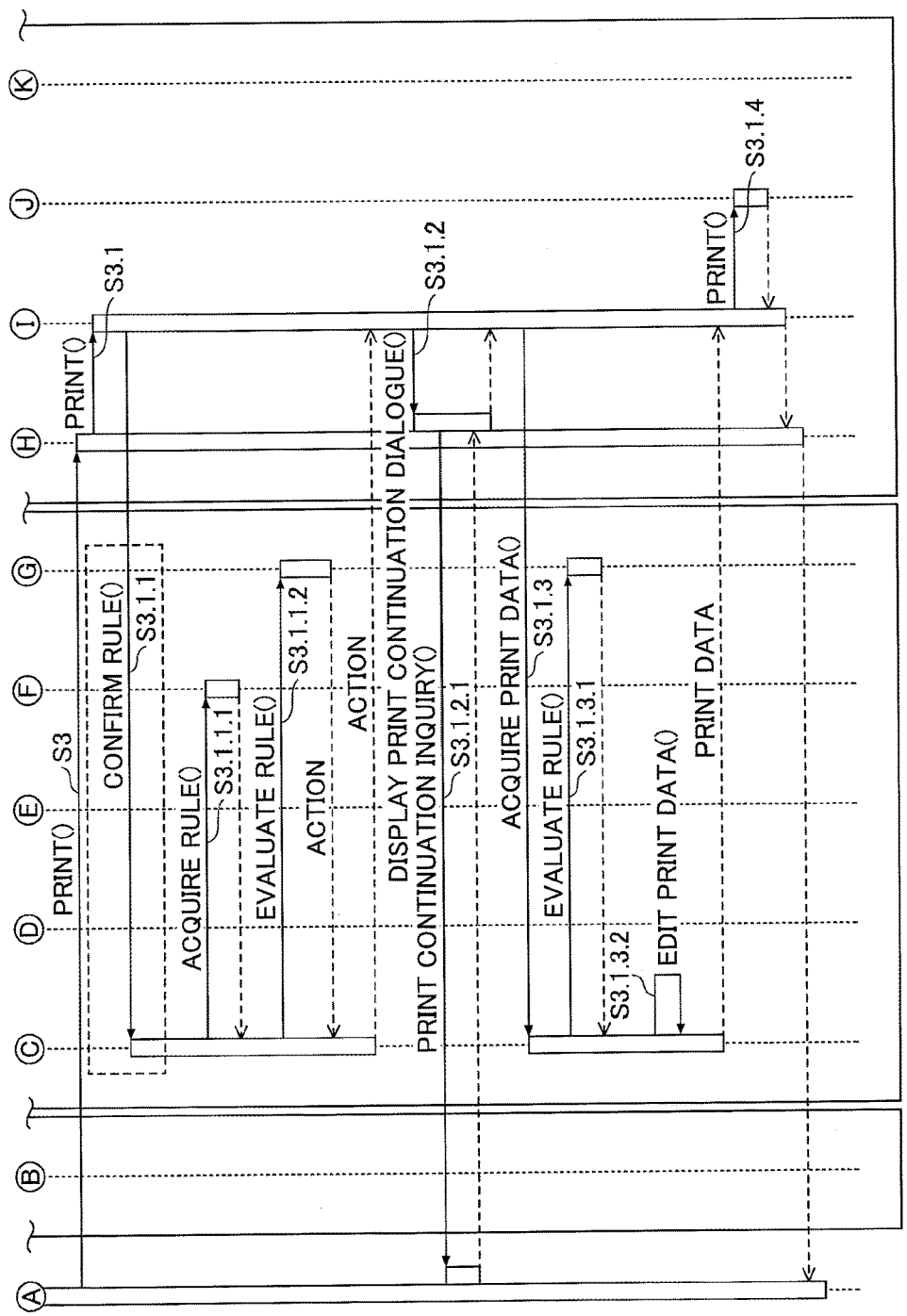

FIGS. 16A and 16B are a sequence diagram illustrating an example of a rule-based printing process performed by the print system 10 in accordance with the fifth embodiment. The following focuses mainly on the difference between the process of FIGS. 16A and 16B and the process of FIGS. 14A and 14B to avoid duplicating description. In FIGS. 14A and 14B, the difference from the process of FIGS. 14A and 14B is S2.2.1.3:

S2.2.1.3: When there is an action that needs to be processed by the image forming apparatus 13, the job controller 46 of the print server 12 attaches such an action to the job list. The job controller 46 also determines whether there is any print job having a determination result that may change at the timing of the second rule evaluation. The job controller 46 further determines whether there is any print job having a determination result that may change at the timing of the second rule evaluation but the second rule evaluation is unnecessary until the expiration time is reached.

Hence, the job controller 46 detects the print job having the expiration time and having a determination result that may change, and the print job having no expiration time and having a determination result that may change. The job list in this case will be illustrated later with reference to FIG. 17.

S3.1.1: When the user U selects a print job in S3, the print manager 33 optionally performs the second rule evaluation on the print job selected by the user U. This step will be illustrated later with reference to FIG. 18.

Job List

FIG. 17 is a diagram illustrating an example of a list of jobs (job list) acquired by the image forming apparatus 13 in response in S2.2.1. In FIG. 17, components provided with the same reference numbers as the print system 1 according to the fourth embodiment illustrated in FIG. 15 implement the same functional components. Hence, only main components of the fifth embodiment are described below.

In FIG. 17, the expiration time is described in an "expiration date" attribute of the <actions> tag illustrated in the description 10. When the print job includes the expiration date, a "2015/01/2709 50 23" value is described in the "expiration date" attribute, and when the print job includes no expiration time, the attribute value is not described.

In the example of FIG. 17, the print job described in the description 4 needs to be reevaluated by the image forming apparatus 13 without expiration date, and the print job described in the description 5 does not need to be reevaluated by the image forming apparatus 13 until the expiration time is reached. That is, the "required" expiration date=" " is a print job that does not include a time condition because the print job had the determination result that does not change at the timing of the rule evaluation. The "notRequired" expiration date="2015/01/2709 50 23" is a print job having a determination result that may change at the timing of the second rule evaluation, and also having a time condition (outside the expiration time).

Note that expiration time may be attached to the print job that needs to have the reevaluation performed (i.e., reevaluation is necessary until the expiration time is reached).

The print job described in the description 5 has an action (notification) that needs to be processed by the image forming apparatus 13. In this case, when the second rule evaluation is within the expiration time, the second rule evaluation is not performed. Thus, the image forming apparatus 13 transmits an inquiry to the user U to check whether the user U desires to continue printing based on the determination result of the first rule evaluation. When the second rule evaluation exceeds the expiration time, the image forming apparatus 13 transmits an inquiry to the user U to check whether the user U desires to continue printing based on the determination result of the second rule evaluation.

There are following four combinations of the "required" or "notRequired", and "presence" or "absence" of the expiration time.

(i) A combination of "notRequired" and "absence" of expiration time

For example, the determination result of the rule such as "forcefully perform duplicate printing when the print job includes printing pages of 100 pages or more" is unchanged regardless of the time of determination. Thus, such rules needs no reevaluation and no setting of the expiration time.

(ii) A combination of "required" and "absence" of the expiration time

For example, the printable number of sheets may be constantly changeable; that is, the printable number of sheets may change between displaying the list and receiving print instruction, due to execution of printing by another MFP. Hence, it is preferable to evaluate the rule at the time of printing.

(iii) A combination of "notRequired" and "presence" of expiration time

It is inefficient to evaluate the rule every time printing is executed; hence, the administrator may set a time generally required time (e.g., two minutes) between the user's selecting a job and the user's executing printing as the expiration time (at the time of displaying the list+2 minutes). In this case, the image forming apparatus 13 does not reevaluate the rule when the current time is within the expiration time and reevaluates the rule when the current time exceeds the expiration time.

(iv) A combination of "required" and "presence" of the expiration time

This condition is applied to the print job initially having the rule evaluated in a rigorous manner but not having the rule evaluated after the expiration date. For example, in a case of printing a document requiring secrecy until a certain date and time but not requiring reevaluation of the rule once the expiration date has elapsed.

Determination of Reevaluation

Figure 18:
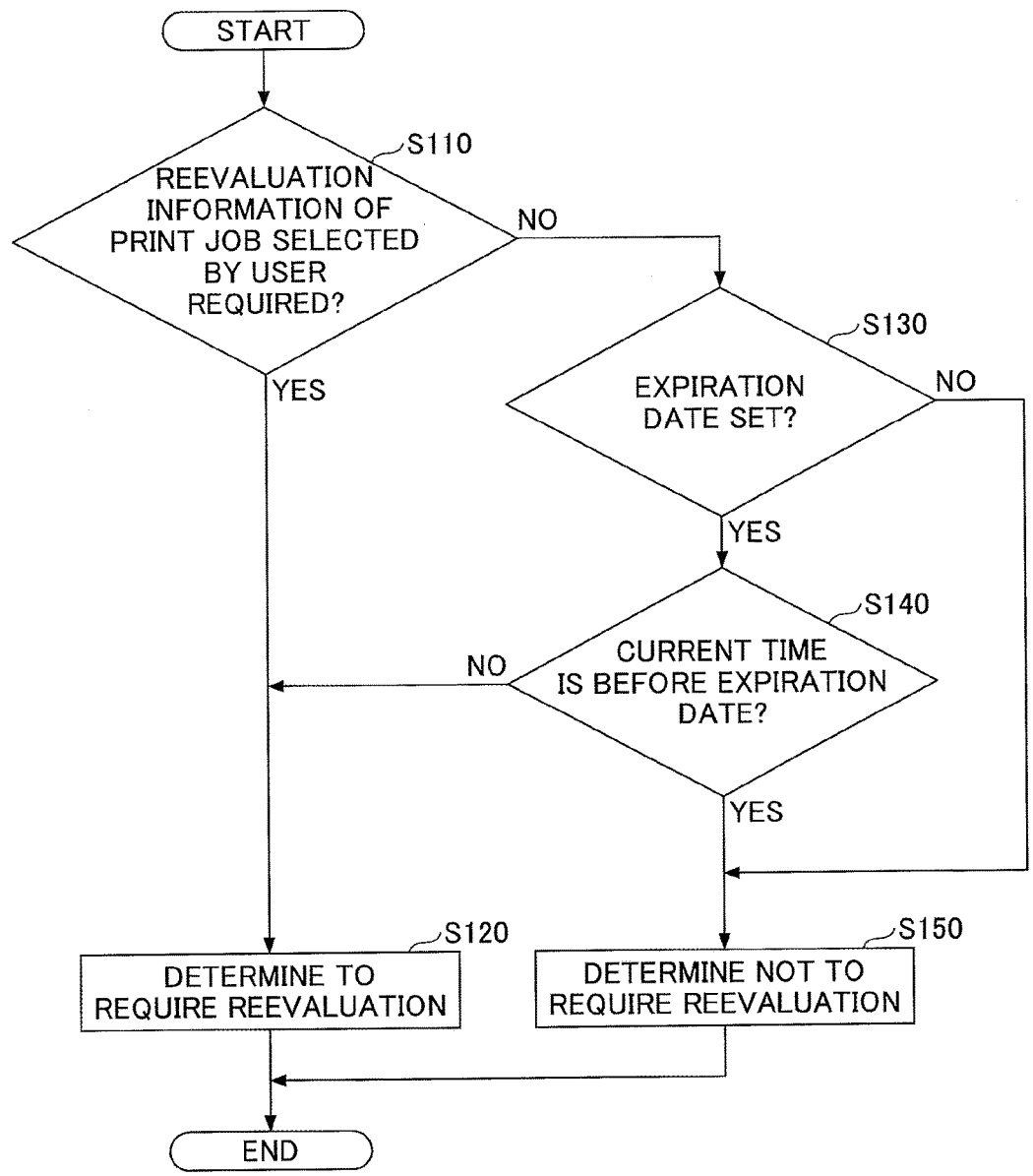
FIG. 18 is a flowchart illustrating an example of a process of determining whether to perform a second rule evaluation in accordance with an embodiment (the fifth embodiment)

FIG. 18 is a flowchart illustrating an example of a process of determining whether to perform reevaluation (a second rule evaluation) in accordance with the fifth embodiment.

The print manager 33 determines whether the reevaluation information of the print job selected by the user U is "required" (step S110).

When the determination in step S110 is YES, the print manager 33 determines to transmit the reevaluation request (step S120).

When the determination in step S110 is NO, the print manager 33 determines whether the expiration time is set in the reevaluation information (step S130).

When the determination in step S130 is NO, the reevaluation information is "notRequired" and the expiration time is not set. Hence, the print manager 33 determines not to transmit the reevaluation request (step S150).

When the determination in step S130 is YES, the print manager 33 determines whether the current time is within the expiration time (step S140).

When the determination in step S140 is NO, the reevaluation information is "notRequired" but the current time is outside the expiration time. Hence, the print manager 33 determines to transmit the reevaluation request (step S120).

On the other hand, then the determination in step S140 is YES, the reevaluation information is "notRequired" and the current time is within the expiration time. Hence, the print manager 33 determines not to transmit the reevaluation request (step S150).

In the print system 10 according to the fifth embodiment, the print job has the expiration time (the expiration date) attached, reevaluation (second evaluation) is not required when the current time is within the expiration time. Accordingly, the number of communications may be reduced compared to the fourth embodiment due to omitting the second evaluation (reevaluation) for the cases within the expiration time.

Sixth Embodiment

In the print system 10 according to a sixth embodiment, the user U selects two or more print jobs, and the image forming apparatus 13 sequentially prints the print jobs. The following illustrates the print system 10 that determines whether a print job (hereinafter called a "subsequent print job") subsequent to a previous print job has an action necessary to be executed by the image forming apparatus 13 while the previous print job is being processed. The print system 10 according to the sixth embodiment may reduce the user U's waiting time.

Operation Process

Figure 19A:
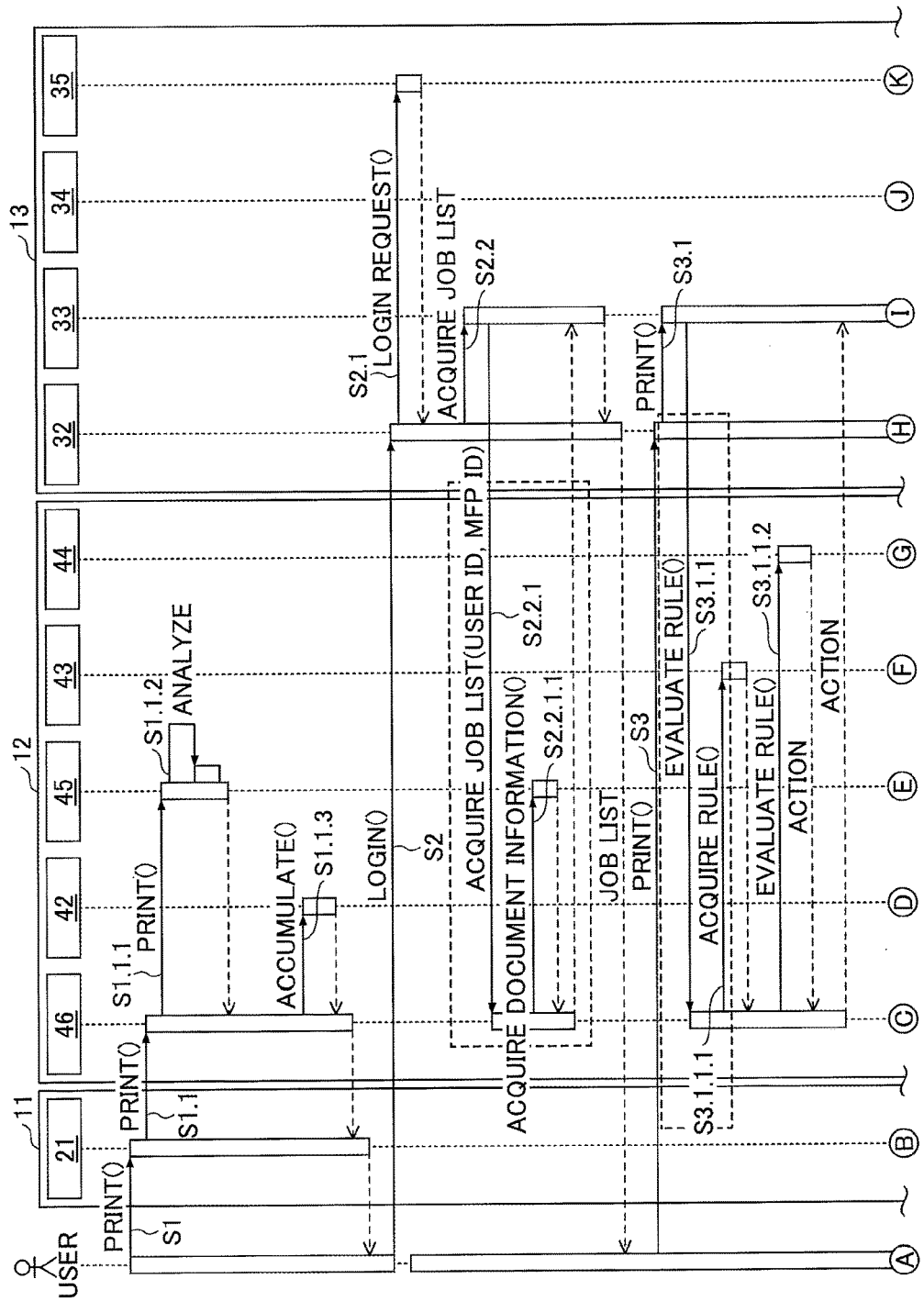
FIGS. 19A and 19B are a sequence diagram illustrating an example of a rule-based printing process performed by a print system in accordance with an embodiment (a sixth embodiment)
Figure 19B:
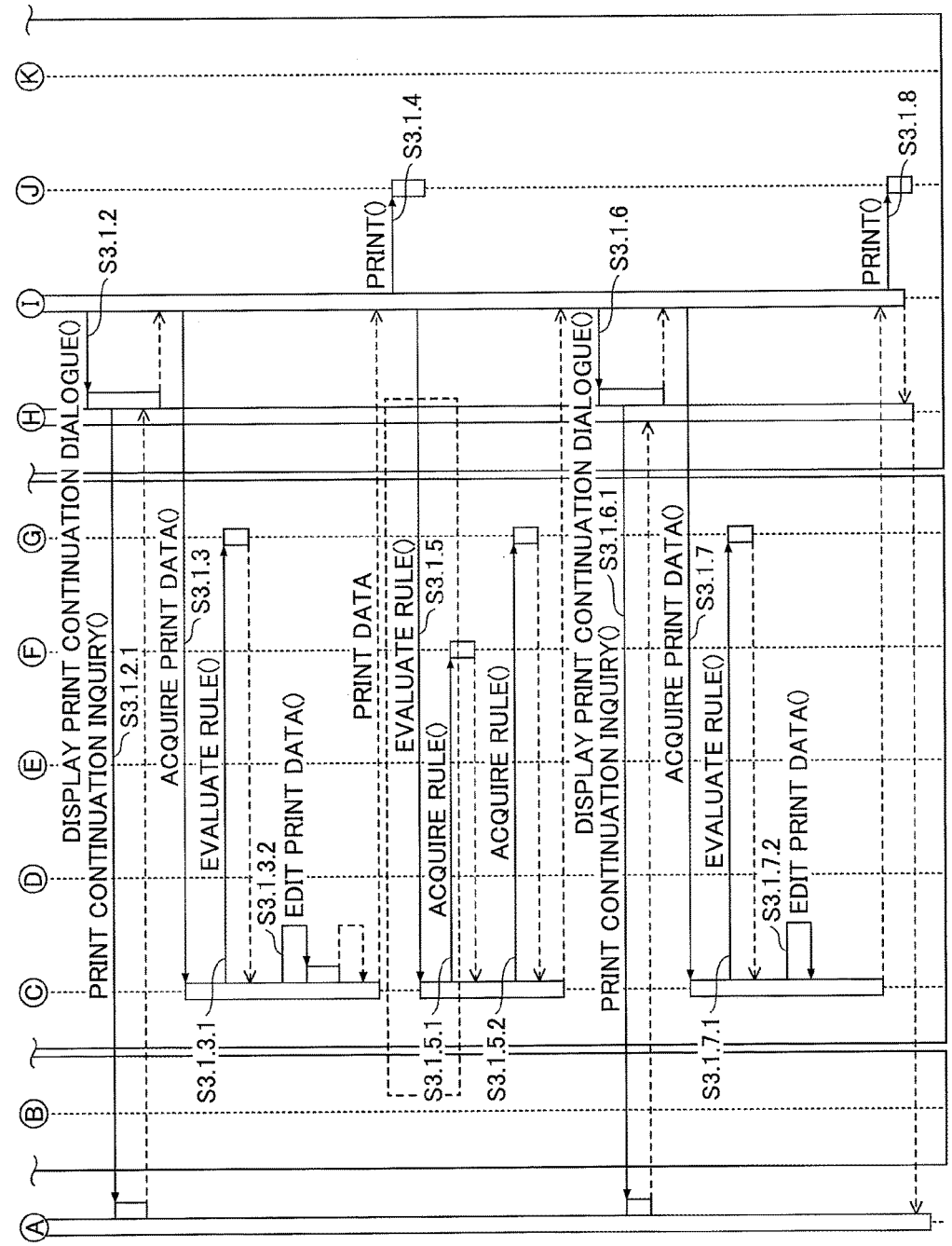

FIGS. 19A and 19B are a sequence diagram illustrating an example of a rule-based printing process performed by the print system 10 in accordance with the sixth embodiment. The following focuses mainly on the difference between the process of FIGS. 19A and 19B and the process of FIGS. 6A and 6B to avoid duplicating description.

S2.2.1: the rule data will not be acquired when the print manager 33 acquires a job list in the print system 10 according to the sixth embodiment. Hence, the action determination result is not attached to the job list.

S3: It is assumed that the user U has selected two or more print jobs.

S3.1: The print manager 33 transmits a rule evaluation request for the first print job. This step differs from the process illustrated in FIGS. 6A and 6B. This step performs rule evaluation without being missed because no rule evaluation is yet to be conducted.

Steps S3.1.1.1 to S3.1.4 in FIGS. 19A and 19B are similar to corresponding steps in FIGS. 6A and 6B. S3.1.5: The print manager 33 transmits a rule evaluation request for the second print job in parallel with printing in S3.1.4. Steps S3.1.5.1 to S3.1.8 in FIGS. 19A and 19B are similar to corresponding steps S3.1.1.1 to S3.1.4 in FIGS. 6A and 6B.

In the print system 10 according to the sixth embodiment, printing of the first print job is performed in parallel with the rule evaluation of the second print job when sequentially printing the print jobs. Hence, the time between starting of printing and completion of printing the two or more print jobs in sequentially printing two or more print jobs may be reduced compared to the time between starting of printing and completion of separately printing each of the print jobs.

Seventh Embodiment

In the print system 10 according to a seventh embodiment, the print server 12 transmits an action together with the print data to the image forming apparatus 13, and the image forming apparatus 13 displays a print continuation dialog to the action transmitted together with the print data.

Operation Process

Figure 20B:
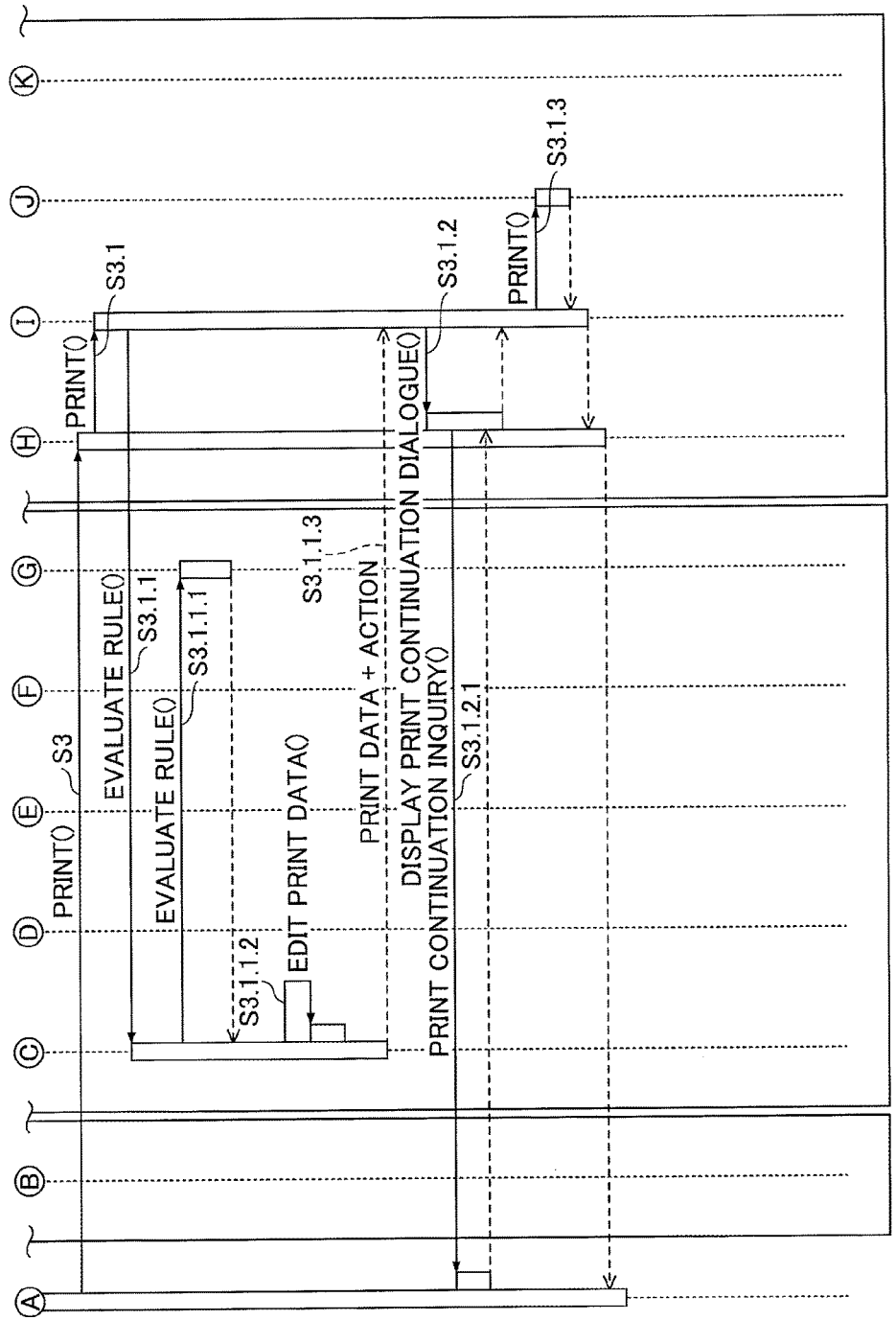

FIGS. 20A and 20B are a sequence diagram illustrating an example of a rule-based printing process performed by the print system 10 in accordance with the seventh embodiment. The following focuses mainly on the difference between the process of FIGS. 20A and 20B and the process of FIGS. 6A and 6B to avoid duplicating description.

S2.2.1: The print manager 33 of the image forming apparatus 13 transmits a job list request to the job controller 46 of the print server 12.

S2.2.1.1: The job controller 46 transmits the job list to the image forming apparatus 13 without extracting the rule data.

S3: The user U selects a desired one of the print jobs from the displayed job list (the displayed list of the print jobs) and transmits an instruction to execute the selected print job.

S3.1.1: The input-output part 32 transmits a print request together with identifier information of the print job selected by the user U to the print manager 33. In this step, the print manager 33 transmits a print data request to the print server 12.

S3.1.1.1: The job controller 46 of the print server 12 transmits a rule data request for acquiring the rule data identical to the rule data in association with the user ID and the identifier information of the image forming apparatus 13 to the rule manager 43. The job controller 46 transmits to the rule engine 44 a rule data evaluation request for evaluating the rule data with respect to the document information and the information subject to application extracted from the print data of the print job selected by the user U. The job controller 46 acquires an action corresponding to the print job in response to the rule data request.

S3.1.1.2: The job controller 46 edits the print settings of the print data in accordance with the action extracted from the rule data.

S3.1.1.3: The job controller 46 transmits the print data and the action in one transmission process to the image forming apparatus 13. The transmission of the print data and the action in one transmission process indicates the print data and the action being transmitted simultaneously in one process using the specification of HTTP for downloading multiple files in response to one request. Alternatively, the action may be attached to the print data using the PDL comment and the print data with the attached action are transmitted in one process.

S3.1.2: The print manager 33 of the image forming apparatus 13 displays, if necessary, a print continuation dialog on the operations part 307, based on the acquired action. The method for determining whether to display the print continuation dialog is already illustrated in FIG. 8.

Hence, printing is executed in S3.1.3 when the print continuation dialog is not displayed. When the print continuation dialog is displayed, printing ends or printing is executed in S3.1.3, according to the user U's determination as to whether to continue printing.

In the print system 10 according to the seventh embodiment, the print server 12 transmits the print data and the action simultaneously in one process. Accordingly, the print continuation dialog may be displayed with the number of communications performed the same as the number of communications performed without displaying the print continuation dialog.

Other Embodiments

The preferred embodiments and examples are described above; however, the present disclosure is not limited to the above-described embodiments and examples. Various alteration and modification may be made within the scope without departing from the gist of the present disclosure.

The above-described configuration examples of the print system 10 such as the configuration example of the print system 10 illustrated in FIGS. 6A and 6B have separately illustrated main functions to simplify the processes of the image forming apparatus 13 and the print server 12 for assisting the understanding of the processes. For example, the functions of the print server 12 may partially be included in the image forming apparatus 13 or the functions of the image forming apparatus 13 may partially be included in the print server 12.

Further, the present embodiments are not limited by separately illustrating the processes or names of the processes. The processes of the image forming apparatus 13 and the print server 12 may further include a large number of processes or sub-processes in accordance with the contents of the processes. Each of the process of the image forming apparatus 13 or the process of the print server 12 may include a large number of sub-processes.

The above-described embodiments has illustrated the aspect in which the user U is notified whether to continue printing at the time of pull printing. However, the user U may be notified that the print result differs from the intended print result at the time of push printing.

Note that the job accumulator 42 is an example of a first acquisition unit (42), the rule engine 44 is an example of a process information reader (44), the job controller 46 is an example of a transmitter (46), the print setting editor 461 is an example of an editor (461), the print manager 33 is an example of a second acquisition unit (33), and the input-output part 32 is an example of a display unit (32). The authenticator 35 is an example of a user identifying unit (35). The print part 34 is an example of a processor (34).

The print server 12 is an example of a first information processing apparatus (12) and the image forming apparatus 13 is an example of a second information processing apparatus (13) or an apparatus (13). The process method performed by the print system 10 is an example of information processing method performed by an information processing system (10), and the rule data management DB 5002 is an example of storage (502).

The print data represent examples of first data, the print settings represent examples of second data, and the action determination result or the determination result represents an example of third data. The process information represents an action or actions, and the predetermined process information represents the actions necessary to be processed by the image forming apparatus 13.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

What is claimed is:

1. An information processing system comprising:
an information processing apparatus; and
an image forming apparatus coupled to the information processing apparatus via a network, wherein
the information processing apparatus includes a processor and a memory, the memory containing computer readable code that, when executed by the processor, configures the processor of the information processing apparatus to,
acquire print data and print settings, the print settings indicating a process to be performed on the print data,
accumulate the print data for subsequent pull printing by the image forming apparatus,
read, from a storage, rule data,
analyze the rule data to determine whether an action is to be performed on the print data to generate a preliminary determination result such that the preliminary determination result indicates whether or not the action is to be performed on the print data,
transmit the preliminary determination result to the image forming apparatus,
selectively receive a continuation request from the image forming apparatus, and
edit the print settings by applying rules in the rule data to the print settings in response to the continuation request, and wherein
the image forming apparatus includes a processor and a memory, the memory containing computer readable code that, when executed by the processor, configures the processor of the image forming apparatus to,
acquire a list of the print data and the preliminary determination result from the information processing apparatus,
receive, from a user, a request to print a selected print data selected from the list of the print data,
determine whether the print settings associated with the selected print data are to be edited based on the preliminary determination result,
transmit, to the information processing apparatus, a rule evaluation request, if the image forming apparatus receives the request to print the selected print data from the user and determines that the print settings associated with the selected print data are to be edited,
receive, from the information processing apparatus, an action instruction corresponding to the selected print data, the action instruction indicating the action to be performed on the print data,
display on a display device an indication of the action, and
selectively transmit, to information processing apparatus, the continuation request in response to the user acquiescing to the action, the continuation request instructing the information processing apparatus to edit the print settings and transmit the print data to the image forming apparatus.

2. The information processing system according to claim 1, wherein
the image forming apparatus includes a user identifier configured to identify a user,
the information processing apparatus reads the rule data with respect to the print data for each of the print data capable of being acquired by the user identified by the user identifier,
when the rule data includes the predetermined process information, the information processing apparatus attaches the preliminary determination result to each of the print data included in the list of the print data,
when the preliminary determination result are attached to the print data selected from the list, the image forming apparatus inquires of the information processing apparatus about the rule data read by the information processing apparatus with respect to the print data selected from the list, and
when the image forming apparatus has acquired the predetermined process information, the image forming apparatus displays on the display device indication that the print settings have been edited.

3. The information processing system according to claim 2, wherein
the information processing apparatus attaches information to each of the print data included in the list of the print data, the information representing whether a determination result is changed in accordance with determination timing, the determination result indicating whether the print data satisfies the condition,
when the preliminary determination result are not attached to the print data selected from the list but the information is attached to the print data, the information representing that the determination result is changed in accordance with the determination timing, the image forming apparatus inquires of the information processing apparatus about the rule data with respect to the print data selected from the list, and
when the image forming apparatus has acquired the predetermined process information, the image forming apparatus displays on the display device indication that the print settings have been edited.

4. The information processing system according to claim 3, wherein
the information processing apparatus attaches an expiration time of the determination result to each of the print data included in the list of the print data,
the image forming apparatus inquires of the information processing apparatus about the rule data with respect to the print data selected from the list in accordance with information as to whether a current time has reached the expiration date, and when the image forming apparatus has acquired the predetermined process information, the image forming apparatus displays on the display device indication that the print settings have been edited.

5. The information processing system according to claim 1, wherein after the image forming apparatus has acquired a list of the print data, the image forming apparatus requests the information processing apparatus to transmit the print data selected from the list, the selected print data being received by the image forming apparatus, the information processing apparatus reads the rule data with respect to the print data requested by the image forming apparatus, the information processing apparatus transmits the rule data and the print data to the image forming apparatus in one transmission process, when the rule data includes the predetermined process information, the image forming apparatus displays on the display device indication that the print settings have been edited.

6. The information processing system according to claim 1, wherein the image forming apparatus is configured to, process the print data in accordance with a process indicated by the print settings, query the information processing apparatus about the rule data with respect to subsequent print data while the image forming apparatus is processing the data.

7. The information processing system according to claim 1, wherein when the print settings are changed from the print settings before being edited, the image forming apparatus displays on the display device indication that the print settings have been edited.

8. The information processing system of claim 1, wherein the preliminary determination result has one of two values indicating whether or not the action is to be performed on the print data.

9. The information processing system of claim 1, wherein the information processing apparatus is configured to transmit the preliminary determination result along with the list of the print data to the image forming apparatus.

10. The information processing system of claim 1, wherein after analyzing the rule data to generate the preliminary determination result, the information processing apparatus is configured to evaluate the rules in response to receiving the rule evaluation request from the image forming apparatus to generate the action instruction indicating the action to be performed on the print data.

11. The information processing system of claim 10, wherein the information processing apparatus is configured to evaluate the rules by acquiring the action corresponding to the print job based on the rule data, a user ID associated with the user, and a printer ID associated with the image forming apparatus.

* * * * *